US012293620B2

(12) United States Patent
Yamaoka et al.

(10) Patent No.: US 12,293,620 B2
(45) Date of Patent: May 6, 2025

(54) INFORMATION PROCESSING SYSTEM, INFORMATION PROCESSING METHOD, AND PROGRAM

(71) Applicant: NEC Corporation, Tokyo (JP)

(72) Inventors: Kazuhiko Yamaoka, Tokyo (JP); Keito Tachizaki, Tokyo (JP); Kenichi Oosawa, Tokyo (JP); Junya Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/011,729

(22) PCT Filed: Jun. 29, 2020

(86) PCT No.: PCT/JP2020/025586

§ 371 (c)(1),
(2) Date: Dec. 20, 2022

(87) PCT Pub. No.: WO2022/003796

PCT Pub. Date: Jan. 6, 2022

(65) Prior Publication Data

US 2023/0316838 A1 Oct. 5, 2023

(51) Int. Cl.

*G07C 9/25* (2020.01)
*G07B 15/00* (2011.01)

(Continued)

(52) U.S. Cl.

CPC ............... *G07C 9/25* (2020.01); *G07B 15/00* (2013.01); *G07C 9/27* (2020.01); *G06Q 2240/00* (2013.01); *G07C 9/10* (2020.01)

(58) Field of Classification Search

CPC ... G07C 9/25; G07C 9/27; G07C 9/10; G07B 15/00; G06Q 2240/00
See application file for complete search history.

(56) References Cited

U.S. PATENT DOCUMENTS

2004/0133804 A1* 7/2004 Smith ................ G06Q 20/4014 713/186
2007/0047785 A1* 3/2007 Jang .................. G06V 40/1359 382/125

(Continued)

FOREIGN PATENT DOCUMENTS

CN 103268483 A * 8/2013 ............... G06K 9/00
JP 2002-007933 A 1/2002

(Continued)

OTHER PUBLICATIONS

Telecom Asia (Online), "Hitachi shows off finger vein authentication," Questex LLC, Oct. 31, 2016.*

(Continued)

*Primary Examiner* — Nathan Erb
(74) *Attorney, Agent, or Firm* — Sughrue Mion, PLLC

(57) ABSTRACT

An information processing system includes a user database that stores information obtained by associating first information that specifies a station with second information that indicates an entrance and exit authentication scheme available in a ticket examination system of the station; an information extraction unit that extracts, from the user database, the second information associated with input first information; and an output unit that outputs the second information extracted by the information extraction unit.

14 Claims, 16 Drawing Sheets

(51) Int. Cl.
*G07C 9/27* (2020.01)
*G07C 9/10* (2020.01)

(56) References Cited

U.S. PATENT DOCUMENTS

| | | | | |
|---|---|---|---|---|
| 2012/0254955 | A1* | 10/2012 | Suginaka | G06F 21/34 726/4 |
| 2017/0323405 | A1* | 11/2017 | Jackson | G06Q 10/025 |
| 2019/0279326 | A1* | 9/2019 | Chen | H04L 9/30 |

FOREIGN PATENT DOCUMENTS

| | | | |
|---|---|---|---|
| JP | 2007-122334 | A | 5/2007 |
| JP | 2010-067124 | A | 3/2010 |
| JP | 2013-171496 | A | 9/2013 |
| JP | 2016-045811 | A | 4/2016 |
| JP | 2016-051366 | A | 4/2016 |
| JP | 2017-097487 | A | 6/2017 |
| JP | 2019-159795 | A | 9/2019 |
| JP | 2019-159974 | A | 9/2019 |
| JP | 2019-159985 | A | 9/2019 |
| WO | 2016/135860 | A1 | 9/2016 |
| WO | 2018/225202 | A1 | 12/2018 |
| WO | 2019/087416 | A1 | 5/2019 |

OTHER PUBLICATIONS

Kaushik, Himanshu, "City stations start biometric verification for railway tickets [Ahmedabad]," The Times of India, New Delhi, Jan. 28, 2014.*

JP Office Action for JP Application No. 2022-141350, mailed on Oct. 31, 2023 with English Translation.

International Search Report for PCT Application No. PCT/JP2020/025586, mailed on Sep. 15, 2020.

JP Office Action for JP Application No. 2022-141350, mailed on Jul. 18, 2023 with English Translation.

JP Office Action for JP Application No. 2024-065737, mailed on Feb. 18, 2025 with English Translation.

* cited by examiner

| User ID | Biometric information | Two-dimensional code | IC number |
|---|---|---|---|
| × × × | × × × | × × × | × × × |
| × × × | × × × | × × × | × × × |
| × × × | × × × | × × × | × × × |
| × × × | × × × | × × × | × × × |
| × × × | × × × | × × × | × × × |
| ⋮ | ⋮ | ⋮ | ⋮ |

| User ID | Station where authentication was performed | Entry/exit status | Authentication scheme |
|---|---|---|---|
| × × × | Station A | 1 | IC card |
| × × × | Station B | 2 | IC card |
| × × × | Station A | 1 | IC card |
| × × × | Station B | 2 | Two-dimensional code |
| × × × | Station C | 1 | Biometric information |
| ⋮ | ⋮ | ⋮ | ⋮ |

| Station (first information) | Authentication scheme (second information) | | |
|---|---|---|---|
| | IC card authentication | Two-dimensional code authentication | Face authentication |
| Station A | ○ | × | × |
| Station B | ○ | ○ | × |
| Station C | ○ | ○ | ○ |
| ⋮ | ⋮ | ⋮ | ⋮ |

INFORMATION PROCESSING SYSTEM, INFORMATION PROCESSING METHOD, AND PROGRAM

This application is a National Stage Entry of PCT/JP2020/025586 filed on Jun. 29, 2020, the contents of all of which are incorporated herein by reference, in their entirety.

TECHNICAL FIELD

The present disclosure relates to an information processing system, an information processing method, and a program.

BACKGROUND ART

In recent years, in railway ticket examination systems, it has been proposed to control the passage through automatic ticket examination apparatuses by various authentication schemes such as face authentication and two-dimensional code authentication in addition to IC card authentication (see, for example, Patent Document 1). However, it is unlikely that all authentication schemes will be introduced at the same time for all ticket examination systems for practical use. For example, there may be a station where the face recognition function has been introduced and a station where the face recognition function has not been introduced.

PRIOR ART DOCUMENTS

Patent Documents

[Patent Document 1] Japanese Unexamined Patent Application Publication No. 2019-159795

DISCLOSURE OF THE INVENTION

Problem to be Solved by the Invention

However, at present, there is no way for users to confirm what kind of authentication scheme can be used at which station. Therefore, for example, the user cannot confirm whether the face recognition function can be used at the boarding station or the alighting station.

The present disclosure has been made in view of such circumstances, and an object thereof is to provide an information processing system, an information processing method, and a program that allows a user to confirm what kind of authentication scheme can be used at which station.

Means for Solving the Problem

One example aspect of the present invention is an information processing system including: a user database that stores information obtained by associating first information that specifies a station with second information that indicates an entrance and exit authentication scheme available in a ticket examination system of the station; an information extraction unit that extracts, from the user database, the second information associated with input first information; and an output unit that outputs the second information extracted by the information extraction unit.

One example aspect of the present invention is an information processing method in which a computer includes a database that stores information obtained by associating first information that specifies a station with second information that indicates an entrance and exit authentication scheme available in a ticket examination system of the station, the method including an information extraction step in which the computer, upon receiving the first information from an external communication terminal, extracts, from the database, the second information associated with the first information, and an output step in which the computer outputs the second information extracted by the information extraction step to the communication terminal.

One example aspect of the present invention is a program for making a computer function as the information processing system.

Effect of the Invention

As described above, according to the present disclosure, it is possible for the user to confirm what kind of authentication scheme can be used at which station.

EXAMPLE EMBODIMENTS

Figure 1:
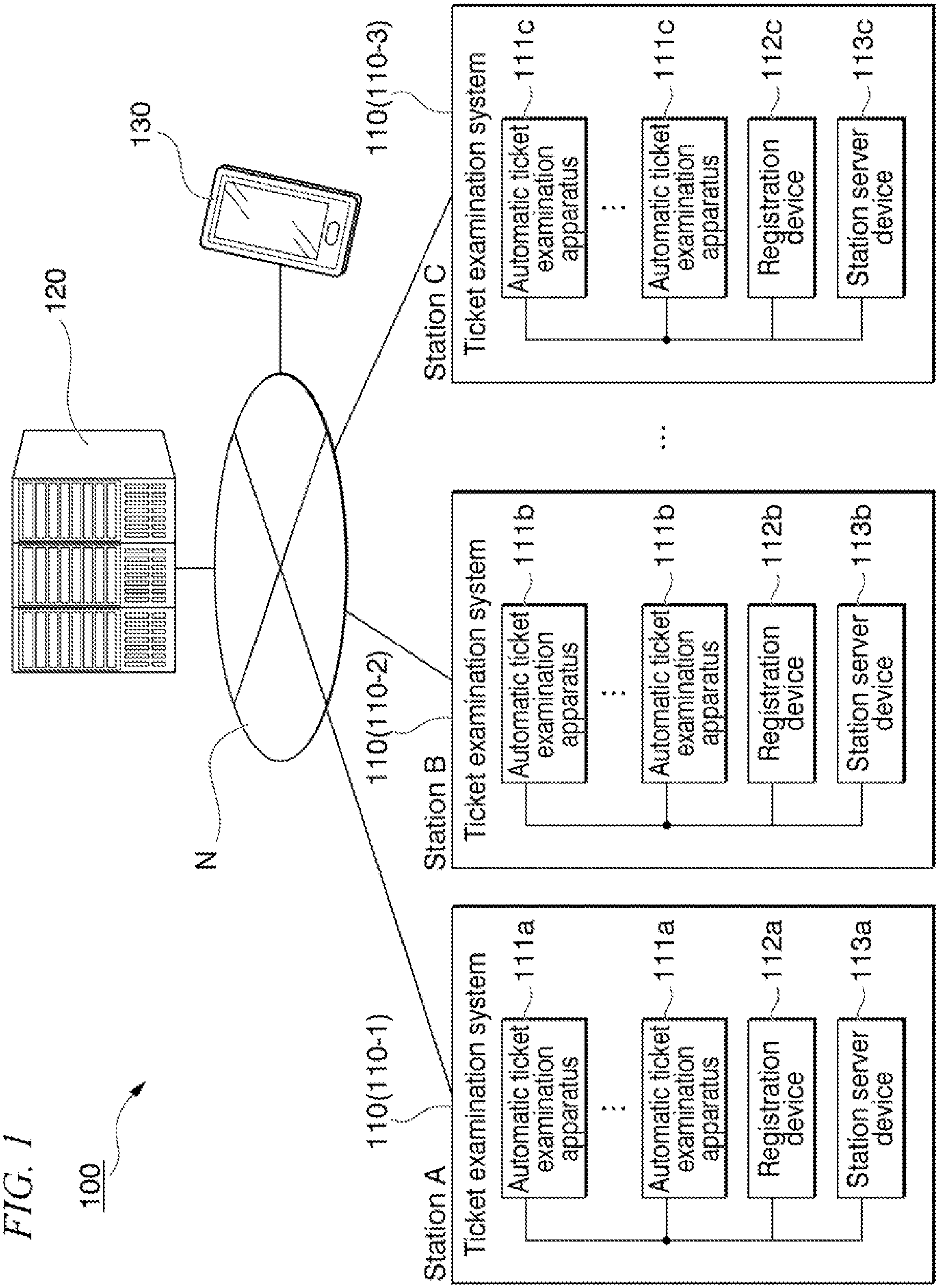
FIG. 1 is a configuration diagram of an information processing system 100 according to the present example embodiment.

Hereinbelow, the present invention will be described through example embodiments of the invention, but the following example embodiments do not limit the invention within the scope of the claims. Also, not all combinations of features described in the example embodiments are essential to the means of solving the invention. In the drawings, the same or similar parts may be designated by the same reference numerals to omit duplicate explanations. In addition, the shape and size of elements in the drawings may be exaggerated for a clearer explanation.

FIG. 1 is a configuration diagram of an information processing system 100 according to this example embodiment. The information processing system 100 is provided with a plurality of ticket examination systems 110 (110-1 to 110-3), a center server 120, and a communication terminal 130. The information processing system 100 of the present example embodiment will be described with respect to the case of having three ticket examination systems 110, but the present example embodiment is not limited thereto, and may have one or more ticket examination systems 110. Further, the information processing system 100 may have two ticket examination systems 110 or may have four or more ticket examination systems 110.

The ticket examination system 110 manages the entry and exit of users at railway stations. The ticket examination system 110 is provided at each station. The ticket examination system 110 manages the user's entry into the ticket examination premises and exit from the ticket examination premises by one or more authentication schemes.

The authentication scheme of this example embodiment is at least one of biometric recognition and media authentication. The biometric authentication is performed by the ticket examination system 110 reading biometric information from the user and performing collation with biometric information registered in the ticket examination system 110 in advance. The biometric information of the present example embodiment is a feature quantity of the user's face. That is, the biometric authentication of this example embodiment is so-called face authentication. However, the biometric authentication is not limited thereto, and the biometric authentication may be fingerprint authentication, vein pattern authentication, iris authentication, or a combination thereof.

Media authentication performs authentication processing by reading ticket information recorded on a recording medium and performing collation with ticket information registered in the ticket examination system 110. The recording medium should be capable of recording information. For example, the recording medium is at least any one of a transportation IC (Integrated Circuit) card, a magnetic recording media (magnetic ticket), a recording medium that records (prints or displays) a barcode or a two-dimensional code such as a QR code (registered trademark), a communication terminal 130 having the same function as an IC card, and a communication terminal 130 that displays information of a barcode or a two-dimensional code such as a QR code. As an example, the medium authentication of the present example embodiment includes IC card authentication that performs authentication processing by reading information including identification information recorded on an IC card as ticket information, and two-dimensional code authentication that performs authentication processing by acquiring ticket information by reading a two-dimensional code displayed on the communication terminal 130 or a paper medium.

As an example, the authentication scheme of the present example embodiment described below has three authentication schemes of face authentication, IC card authentication, and two-dimensional code authentication.

The ticket examination systems 110-1 to 110-3 may have the same authentication scheme, or may have different authentication schemes. Further, the ticket examination systems 110-1 to 110-3 may each have a plurality of authentication schemes.

The ticket examination system 110-1 is installed at station A. In the ticket examination system 110-1, only IC card authentication can be used. That is, the authentication scheme of the ticket examination system 110-1 is only IC card authentication. Hereinbelow, the configuration of the ticket examination system 110-1 will be described.

The ticket examination system 110-1 is provided with a plurality of automatic ticket examination apparatuses 111*a*, a registration device 112*a*, and a station server device 113*a*.

The automatic ticket examination apparatus 111*a* is installed at station A, and only IC card authentication is possible. The automatic ticket examination apparatus 111*a* has two gate bodies facing each other across the ticket examination passage. The automatic ticket examination apparatus 111*a*, by having two gate bodies arranged facing each other in opposite directions, restricts the passage of users in the ticket examination passage formed between the two gate bodies (allows passage/prohibits passage). One gate body performs ticket examination processing for users exiting from inside the station. The other gate body performs ticket examination processing for users entering the station premises. However, each gate body may have the same constitution.

Figure 2:
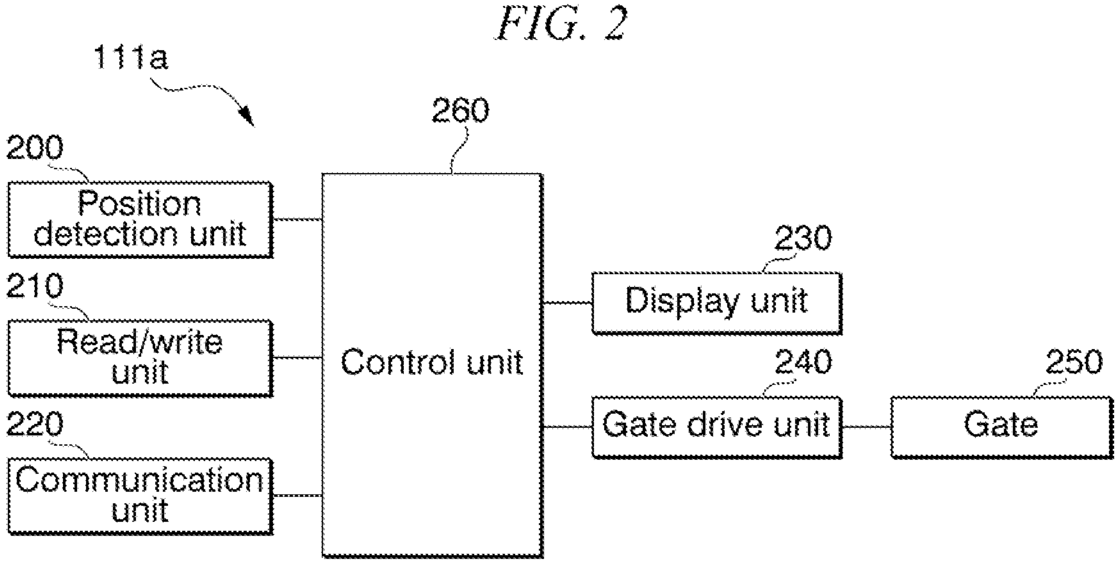
FIG. 2 is a configuration diagram of an automatic ticket examination apparatus 111 in the present example embodiment.

FIG. 2 is a block diagram showing a configuration of the main parts of the automatic ticket examination apparatus 111*a* according to the present example embodiment. The automatic ticket examination apparatus 111*a* is provided with a position detection unit 200, a read/write unit 210, a communication unit 220, a display unit 230, a gate 240, a gate drive unit 250, and a control unit 260.

The position detection unit 200 detects the position of a user passing through the ticket examination passage. The position detection unit 200 outputs the detection result to the control unit 260. The position detection unit 200 is provided with, for example, a plurality of light emitting elements arranged along the ticket examination passage with respect to one gate body. Further, the position detection unit 200 is provided with a plurality of light receiving elements respectively arranged in the other gate body at positions facing each of the plurality of light emitting elements with the ticket examination passage interposed therebetween. If there is a light receiving element that does not receive light emitted from the light emitting element, the position detection unit 200 determines that the user exists at the position corresponding to that light receiving element.

The read/write unit 210 reads the ticket information including the identification information (IC number) of the IC card from the IC card that is being held. The read/write unit 210 outputs the read ticket information to the control unit 260. Further, the read/write unit 210 may write the information of the entrance station and the information of the exit station to the IC card. The ticket information read from the IC card may include, for example, the boarding history, information on the entrance station, information on a transfer station, information on the exit station, information of each time of passing through the automatic ticket examination apparatus 111*a*, balance information of the IC card, and the like written on the IC card.

The communication unit 220 transmits and receives various pieces of data to/from the station server device 113*a* via the communication network. The communication unit 220 is a communication interface that connects the automatic ticket examination apparatus 111*a* to a communication network by wire or wirelessly, in order to execute data communication according to a predetermined communication protocol with an external device such as a station server device 113*a* via this communication network. The communication unit 220 transmits the ticket information read by the read/write unit 210 to the station server device 113*a*. Further, the communication unit 220 receives, for example, a determination result of passage permission/prohibition for the user from the station server device 113*a*. Passage permission/prohibition is either passage permission or passage prohibition.

The display unit 230 is provided in each gate body and displays a message to users passing through the ticket examination passage. For example, the display unit 230 is arranged on the upper surface of the gate body. The display unit 230 is for example a liquid crystal display. When the passage of the user is permitted, the display unit 230 displays a message indicating that the user can pass. If the user is not allowed to pass, the display unit 230 displays a message indicating that the user cannot pass (prohibited). When the automatic ticket examination apparatus 111*a* is used for exiting, the display unit 230 may display, for example, a message indicating that the fare is insufficient.

The gate 240 is provided in each of the gate bodies. The gate 240 is, for example, a door that can be opened and closed. When the gate 240 is opened, the user can pass through the ticket examination passage of the automatic ticket examination apparatus 111*a*. When the gate 240 is closed, the user cannot pass through the ticket examination passage of the automatic ticket examination apparatus 111*a*. The gate 240 may be a physical door or an electronic door using light. Further, the gate 240 may be a voice gate that permits or prohibits the passage of the user by voice. Two of the gates 240 may be provided for each of the two gate bodies.

The gate drive unit 250 opens and closes the gate 240 based on the passage permission/prohibition determination result received from the station server device 113*a*. When the communication unit 220 receives the determination result indicating the passage permission of the user, the gate drive unit 250 puts the gate 240 in the open state in order to permit the passage of the user. When the communication unit 220 receives the determination result of prohibiting the passage of the user, the gate drive unit 250 puts the gate 240 in a closed state in order to prohibit the passage of the user. The gate drive unit 250 may put the gate 240 in a closed state in order to prohibit passage of the user when the station server device 113*a* cannot perform payment settlement for the user.

The control unit 260 controls the operation of each unit of the position detection unit 200, the read/write unit 210, the communication unit 220, the display unit 230, the gate 240, and the gate drive unit 250. The control unit 260 may be provided with a processor such as a CPU (Central Processing Unit) or MPU (Micro Processing Unit) and non-volatile or volatile semiconductor memory (for example, RAM (Random Access Memory), ROM (Read Only Memory), flash memory, EPROM (Erasable Programmable Read Only Memory) and EEPROM (Electrically Erasable Programmable Read Only Memory). For example, the control unit 260 may be a microcontroller such as an MCU.

The registration device 112*a* is installed near the ticket barrier of station A or the station office. The registration device 112*a* can register biometric information (for example, a face image) of the user used in the automatic ticket examination apparatus 111*a* in the station server device 113*a* and the center server 120. Further, the registration device 112 associates identification information of the user (hereinbelow referred to as "user ID"), the user's biometric information, and ticket information used for medium authentication, and registers those pieces of information in the station server device 113*a* and the center server 120. Here, the ticket information used for medium authentication may be an IC number or authentication information used for two-dimensional code authentication. For example, when the user operates the registration device 112 and inputs the user ID of the user himself/herself, the registration device 112 displays a registration screen corresponding to the user ID. Then, the registration device 112 shifts to the mode of capturing an image of the user's face on the registration screen, and captures an image of the user's face. When the feature quantity is acquired from the image of the user's face, the registration device 112 registers the feature quantity in the station server device 113*a* and the center server 120 in association with the user ID. The registration device 112 is an example of the "registration unit" of the present invention. For example, the registration device 112 may not be installed near the ticket barrier of station A or the station office, and may instead be a communication terminal 130 owned by the user. That is, the registration device 112 may be an information processing device connected to the station server device 113*a* or the center server 120 via the Internet so as to be capable of data communication. The communication terminal 130 may have the function of the registration device 112.

Figure 3:
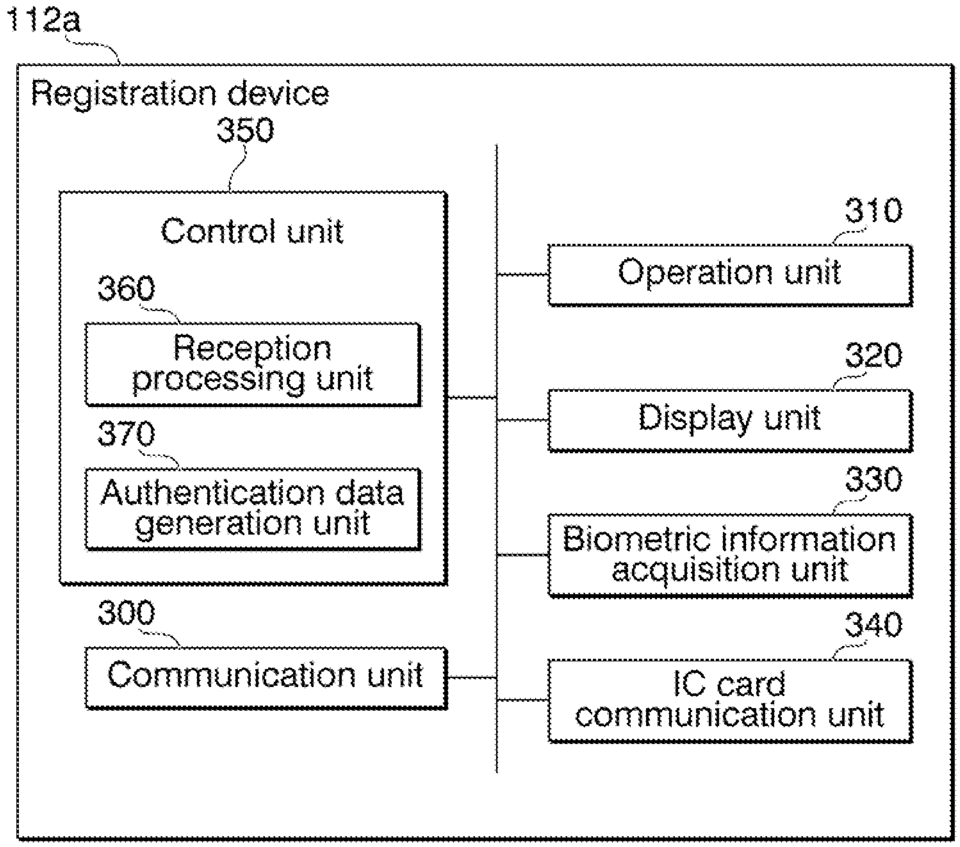
FIG. 3 is a configuration diagram of a registration device 112 according to the present example embodiment.

Hereinbelow, a configuration example of the registration device 112*a* of the present example embodiment will be described with reference to FIG. 3. FIG. 3 is a configuration diagram of the registration device 112*a* according to the present example embodiment. The registration device 112 of the present example embodiment is provided with a communication unit 300, an operation unit 310, a display unit 320, a biometric information acquisition unit 330, an IC card communication unit 340, and a control unit 350.

The communication unit 300 is connected to the station server device 113*a* by wire or wirelessly. The communication unit 300 is connected to the center server 120 via the communication network N.

The operation unit 310 accepts operations by the user. For example, the operation unit 310 is a user interface such as a mouse, a keyboard, or a touch panel. By operating the operation unit 310, the user can perform at least one of work of registering biometric information of the user, work of registering the ticket information, and work of registering credit card settlement information in the registration device 112.

The display unit 320 is provided with a liquid crystal display or an organic EL display that displays various types of information. On the screen of the display unit 320 are displayed information input from the operation unit 310, information acquired by the biometric information acquisition unit 330, and the like.

The biometric information acquisition unit 330 acquires biometric information of the user who intends to register the biometric information. For example, the biometric information acquisition unit 330 acquires a user's facial image by an imaging unit such as a digital camera, and extracts and digitizes facial features (an example of biometric information) from the acquired facial image. When the biometric information is a user's fingerprint or palm print, the biometric information acquisition unit 330 is a fingerprint sensor or palm print sensor that acquires the fingerprint or palm print as the biometric information. When the biometric information is the vein pattern of a finger or palm, the biometric information acquisition unit 330 is a vein pattern scanner that irradiates the finger or palm with near-infrared light to acquire the vein pattern based on the reflected light.

When the IC card is held out, the IC card communication unit 340 reads the identification information stored in the IC card.

When the biometric information of the user is acquired by the biometric information acquisition unit 330, the acquired biometric information is associated with the user ID of the user. Also, the IC number read by the IC card communication unit 340 is associated with the user ID of that user.

The control unit 350 controls the operation of each unit of the registration device 112.

The control unit 350 has a CPU, a ROM, and a RAM. The ROM is a non-volatile storage medium in which control programs such as a BIOS and an operating system for causing the CPU to execute various processes are stored in advance. The RAM is a volatile or non-volatile storage medium for storing various types of information, and is used as a temporary storage memory (work area) for various processes executed by the CPU. The control unit 350 controls the registration device 112 by executing various control programs stored in advance in the ROM on the CPU.

The control unit 350 is provided with a reception processing unit 360 and an authentication data generation unit 370. The control unit 350 functions as a reception processing unit 360 and an authentication data generation unit 370 by executing various processes according to the control programs on the CPU. Some or all of the processing units included in the control unit 350 may be constituted by an electronic circuit. The control programs may be programs for causing a plurality of processors to function as the various processing units.

The reception processing unit 360 acquires the information input from the operation unit 310 and executes processing according to the information. For example, when a biometric information registration instruction is input from the operation unit 310, a registration screen corresponding to the user ID of the user input together with the registration instruction is displayed. For example, when an IC number registration instruction is input from the operation unit 310, the reception processing unit 360 displays a registration screen corresponding to the user ID of the user input together with the registration instruction.

Figures 4, 5:
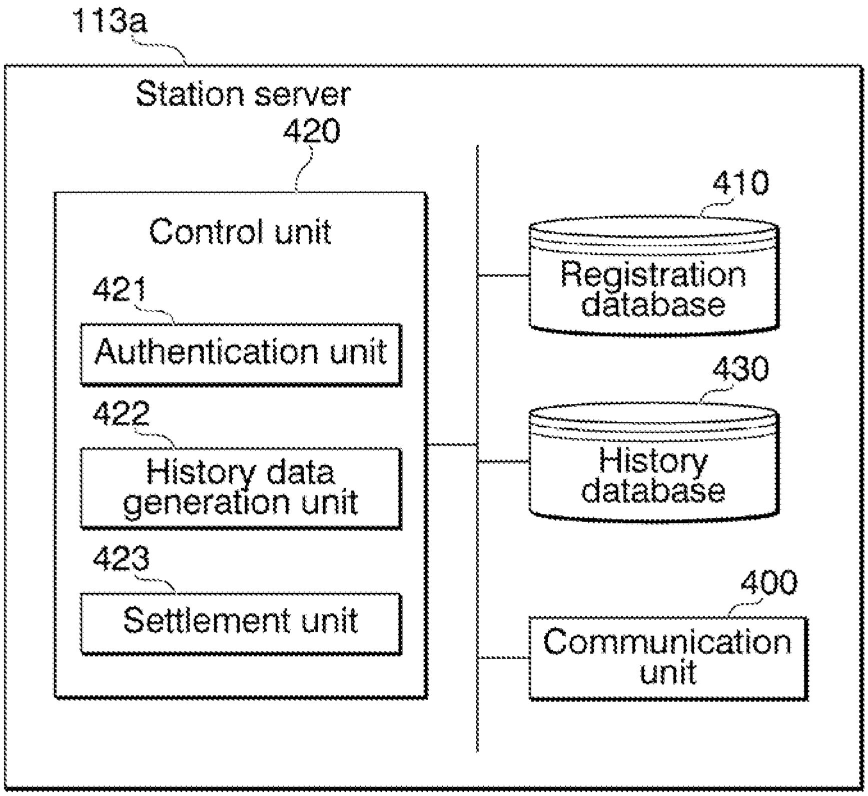
FIG. 4 is a diagram showing an example of authentication data in the present example embodiment.
FIG. 5 is a configuration diagram of a station server device 113 in the present example embodiment.

The authentication data generation unit 370 generates authentication data in which the biometric information acquired by the biometric information acquisition unit 330 and the user ID that was input are associated with each other. The authentication data generation unit 370 may generate authentication data in which the IC number read by the IC card communication unit 340 and the user ID are associated with each other. Further, when the registration instruction of the two-dimensional code is input to the registration screen, the authentication data generation unit 370 may generate a two-dimensional code in which the ticket information (for example, the user ID) required for the two-dimensional code authentication is converted to a two-dimensional code. Then, the authentication data generation unit 370 may generate authentication data by associating the two-dimensional code with the user ID. Further, the authentication data generation unit 370 may issue a paper medium on which the two-dimensional code is printed, or may transmit information of the two-dimensional code to the communication terminal 130 owned by the user. In addition, these pieces of authentication generation data may be generated as one piece of data. That is, as shown in FIG. 4, the authentication data generation unit 370 may generate authentication data in which a user ID, biometric information, a two-dimensional code, and an IC number are associated with each other. The authentication data is used for the authentication process of the ticket examination system 110. The control unit 350 may transmit the authentication data generated by the authentication data generation unit 370 to the station server device and the center server 120 of all stations. The authentication data may be transmitted from the center server 120 to the station server device 113 of another station.

The station server device **113*a* performs authentication processing by IC card authentication in the ticket examination processing of station A. The station server device 113*a*** is provided with one or more physical servers (information processing devices). A plurality of physical servers can communicate with each other by being connected to each other via a communication network. The physical server may be provided with one or more virtual servers. The virtual server may be a server on a cloud system, that is, a cloud server.

A configuration example of the station server device **113*a* of the present example embodiment will be described. FIG. 5 is a configuration diagram of the station server device 113*a* of the present example embodiment. The station server device 113*a* is provided with a communication unit 400, a registration database 410, a control unit 420, and a history database 430**.

The communication unit 400 is connected to a plurality of automatic ticket examination apparatuses **111*a* installed at station A so as to be able to communicate by wire or wirelessly therewith. Further, the communication unit 400 is connected to the communication network N and transmits/receives information to/from the center server 120**.

The communication network N may be a transmission line for wireless communication, or may be a combination of a transmission line for wireless communication and a transmission line for wired communication. The communication network N may be a mobile communication network such as a mobile phone line network, a wireless packet communication network, the Internet and a dedicated line, or a combination thereof.

Authentication data is registered in the registration database 410. The authentication data, upon being generated by the registration device 112, is transmitted to the station server device **113*a* and then transferred from the station server device 113*a* to the center server 120. Then, the authentication data is transferred from the center server 120** to the ticket examination system 110 at each of stations B and C. The authentication data transferred from the center server 120 to the station server device 113*a* is registered in the registration database 410.

The control unit 420 controls the operation of the station server device 113*a*. The control unit 420 is provided with an authentication unit 421, a history data generation unit 422, and a settlement unit 423.

Upon acquiring the ticket information of the IC card from the automatic ticket examination apparatus 111*a*, the authentication unit 421 performs the IC card authentication process based on the ticket information. For example, the authentication unit 421 performs IC card authentication for determining whether or not the IC number included in the ticket information acquired from the automatic ticket examination apparatus 111*a* is valid. As an example, if the IC number included in the ticket information acquired from the automatic ticket examination apparatus 111*a* is registered in the registration database 410, the authentication unit 421 transmits information of passage being permitted to the automatic ticket examination apparatus 111*a*. On the other hand, if the IC number included in the ticket information acquired from the automatic ticket examination apparatus 111*a* is not registered in the registration database 410, the authentication unit 421 transmits information of passage being prohibited to the automatic ticket examination apparatus 111*a*. The authentication unit 421 may have the functions of two-dimensional code authentication and biometric authentication, which will be described later.

When authentication of the user by IC card authentication succeeds, the history data generation unit 422 generates history data in which the user ID, the station where the authentication was performed, the entry/exit status, and the authentication scheme used are associated with each other. The entry/exit status has a first value (for example, 1) when the user enters the station premises, and a second value (for example, 2) when the user exits from the station premises. The history data generation unit 422 stores the history data in the history database 430.

The settlement unit 423 handles payment settlement of the user. For example, when the user passes through the ticket examination passage from the ticket examination premises and exits, the settlement unit 423 may perform payment settlement for the user when the user has been authenticated by the authentication unit 421 as being a registrant.

Figures 6, 7:
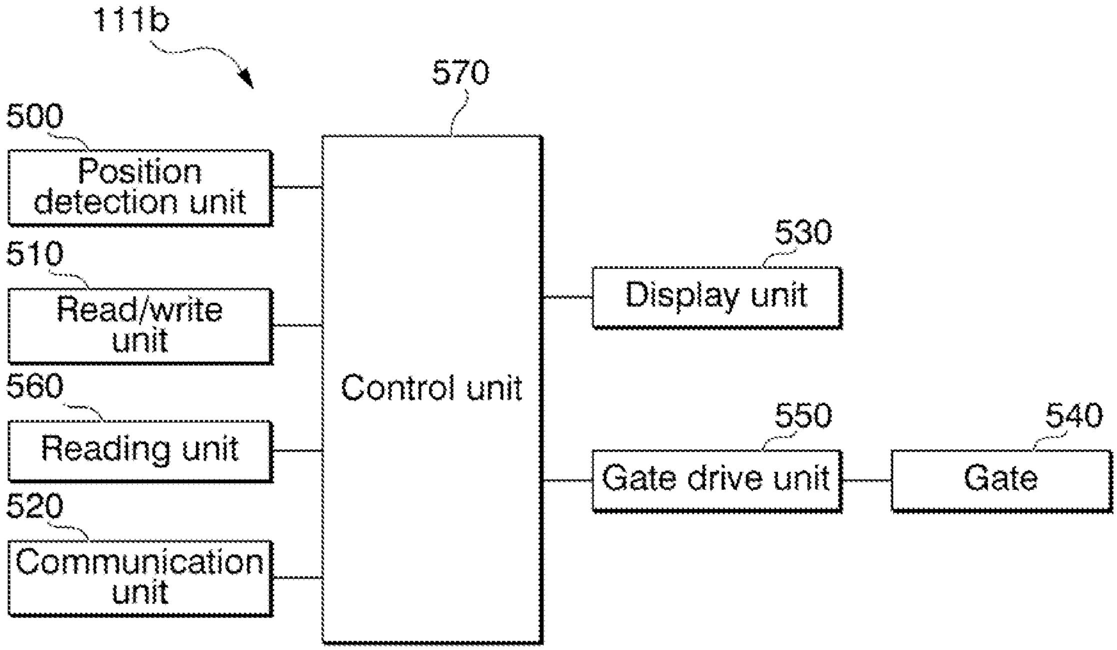
FIG. 6 is a diagram showing an example of history data in the present example embodiment.
FIG. 7 is a configuration diagram of an automatic ticket examination apparatus 111*b* in the present example embodiment.

History data as shown in FIG. 6 is stored in the history database 430. The history data stored in the history database 522 is transmitted to the center server 120 by the communication unit 400.

A ticket examination system 110-2 is provided with a plurality of automatic ticket examination apparatuses 111*b*, a registration device 112*b*, and a station server device 113*b*.

The automatic ticket examination apparatus 111*b* is installed at station B and can only perform IC card authentication and two-dimensional code authentication. The automatic ticket examination apparatus 111*b* has two gate bodies facing each other across the ticket examination passage. The automatic ticket examination apparatus 111*b*, by having two gate bodies arranged facing each other in opposite directions, restricts the passage of users in the ticket examination passage formed between the two gate bodies (allows passage/prevents passage). One gate body performs ticket examination processing for users exiting from inside the station premises. The other gate body performs ticket examination processing for users entering the station premises. However, each gate body may have the same constitution.

FIG. 7 is a schematic configuration diagram of the automatic ticket examination apparatus 111*b* in the present example embodiment. The automatic ticket examination apparatus 111*b* is provided with a position detection unit 500, a read/write unit 510, a communication unit 520, a display unit 530, a gate 540, a gate drive unit 550, a reading unit 560, and a control unit 570.

The position detection unit 500 detects the position of a user passing through the ticket examination passage. The position detection unit 500 outputs the detection result to the control unit 570. The position detection unit 500 may have the same constitution as the position detection unit 200.

The read/write unit 510 reads the ticket information including the IC number from the IC card that is being held. The read/write unit 510 outputs the read ticket information to the control unit 570. The read/write unit 510 may have the same constitution as the read/write unit 210.

The communication unit 520 transmits and receives various types of data to/from the station server device 113*b*. The communication unit 520 is a communication interface that connects the automatic ticket examination apparatus 111*b* to a communication network by wire or wirelessly, in order to execute data communication according to a predetermined communication protocol with an external device such as a station server device 113*b* via this communication network. The communication unit 520 transmits the ticket information read by the read/write unit 710 to the station server device 113*b*. Further, the communication unit 520 receives, for example, a determination result of passage permission/prohibition for the user from the station server device 113*b*.

The display unit 530 is provided in each gate body and displays a message to users passing through the ticket examination passage. The display unit 530 has the same constitution as the display unit 230.

The gate 540 has the same constitution as the gate 240.

The gate drive unit 550 opens and closes the gate 540 based on the determination result of passage permission/prohibition received from the station server device 113*b*. The gate drive unit 550 has the same constitution as the gate drive unit 250.

The reading unit 560 captures an image of the two-dimensional code displayed on a paper medium or the communication terminal 130 to acquire a digital image of the two-dimensional code. The reading unit 560 transmits the digital image to the control unit 570. For example, the control unit 570 acquires ticket information based on the image data and executes ticket examination processing. The user holds the QR code at the QR code reading unit 17 and passes through the ticket examination passage.

The control unit 570 controls the operation of each unit of the position detection unit 500, the read/write unit 710, the communication unit 520, the display unit 530, the gate 540, and the gate drive unit 550. The control unit 570 may be provided with a processor such as a CPU or MPU and a non-volatile or volatile semiconductor memory (for example, RAM, ROM, flash memory, EPROM, and EEPROM). For example, the control unit 570 may be a microcontroller such as an MCU. The control unit 570, upon acquiring the digital image captured by the reading unit 560, optically reads the two-dimensional code from the digital image. Then, the control unit 570 acquires the ticket information recorded in the two-dimensional code that was read. The control unit 570 transmits the ticket information that was read to the station server device 113*b*.

The registration device 112b is installed near the ticket barrier of station B or the station office. The registration device 112b has the same constitution as the registration device 112.

The station server device 113b performs authentication processing by either IC card authentication or two-dimensional code authentication in the ticket examination processing of station B. The station server device 113b is provided with one or more physical servers (information processing devices). A plurality of physical servers can communicate with each other by being connected to each other via a communication network. The physical server may include one or more virtual servers. The virtual server may be a server on a cloud system, that is, a cloud server.

A configuration example of the station server device 113b of the present example embodiment will be described. The station server device 113b has the same constitution as the station server device 113a shown in FIG. 5. Similarly, the station server device 113c has the same constitution as the station server device 113a shown in FIG. 5. In addition, the same reference numerals may be given to the components having the same function, and the description thereof may be omitted. However, for the purpose of distinguishing each component of the station server device 113a, 113b, 113c, the subscript "b" is added to the end of the reference numeral of each component of the station server device 113b, and the subscript "c" is added to the end of the reference numeral of each component of the station server device 113c for some explanations.

The station server device 113b is provided with a communication unit 400b, a registration database 410b, a control unit 420b, and a history database 430b.

The communication unit 400b is connected to a plurality of automatic ticket examination apparatuses 111b installed at station B so as to be able to communicate by wire or wirelessly therewith. The communication unit 400b is connected to the communication network N and transmits/receives information to/from the center server 120.

The registration database 410b has the same constitution as the registration database 410.

The control unit 420b controls the operation of the station server device 113b. The control unit 420b is provided with an authentication unit 421b, a history data generation unit 422b, and a settlement unit 423b.

The authentication unit 421b has a function of IC card authentication processing. Further, the authentication unit 421b has a function of two-dimensional code authentication. For example, the authentication unit 421b performs two-dimensional code authentication for determining whether or not the ticket information of the two-dimensional code acquired from the automatic ticket examination apparatus 111b is valid. As an example, if the ticket information of the two-dimensional code acquired from the automatic ticket examination apparatus 111b is registered in the registration database 410b, the authentication unit 421b transmits information of passage being permitted to the automatic ticket examination apparatus 111b. On the other hand, if the ticket information of the two-dimensional code is not registered in the registration database 410b, the authentication unit 421b transmits information of passage being prohibited to the automatic ticket examination apparatus 111b. The authentication unit 421b may further have a biometric authentication function described later.

When authentication of the user is successful by IC card authentication or two-dimensional code authentication, the history data generation unit 422b generates history data in which the user ID, the station where the authentication was performed, the entry/exit status, and the authentication scheme used are associated with each other. The history data generation unit 422b stores the history data in the history database 430b.

The history data stored in the history database 622 is transmitted to the center server 120 by the communication unit 400b.

The settlement unit 423b handles payment settlement of the user. For example, when the user passes through the ticket examination passage from the ticket examination premises and exits, the settlement unit 423b may perform payment settlement for the user when the user has been authenticated by the authentication unit 421b as being a registrant.

The ticket examination system 110-3 is provided with a plurality of automatic ticket examination apparatuses 111c, a registration device 112c, and a station server device 113c.

The automatic ticket examination apparatus 111c is installed at station C and is capable of IC card authentication, two-dimensional code authentication and biometric authentication. The automatic ticket examination apparatus 111c has two gate bodies facing each other across the ticket examination passage. The automatic ticket examination apparatus 111c, by having two gate bodies arranged facing each other in opposite directions, restricts the passage of users in the ticket examination passage formed between the two gate bodies (allows passage/prohibits passage). One gate body performs ticket examination processing for users exiting from inside the station premises. The other gate body performs ticket examination processing for users entering the station premises. However, each gate body may have the same constitution.

Figure 8:
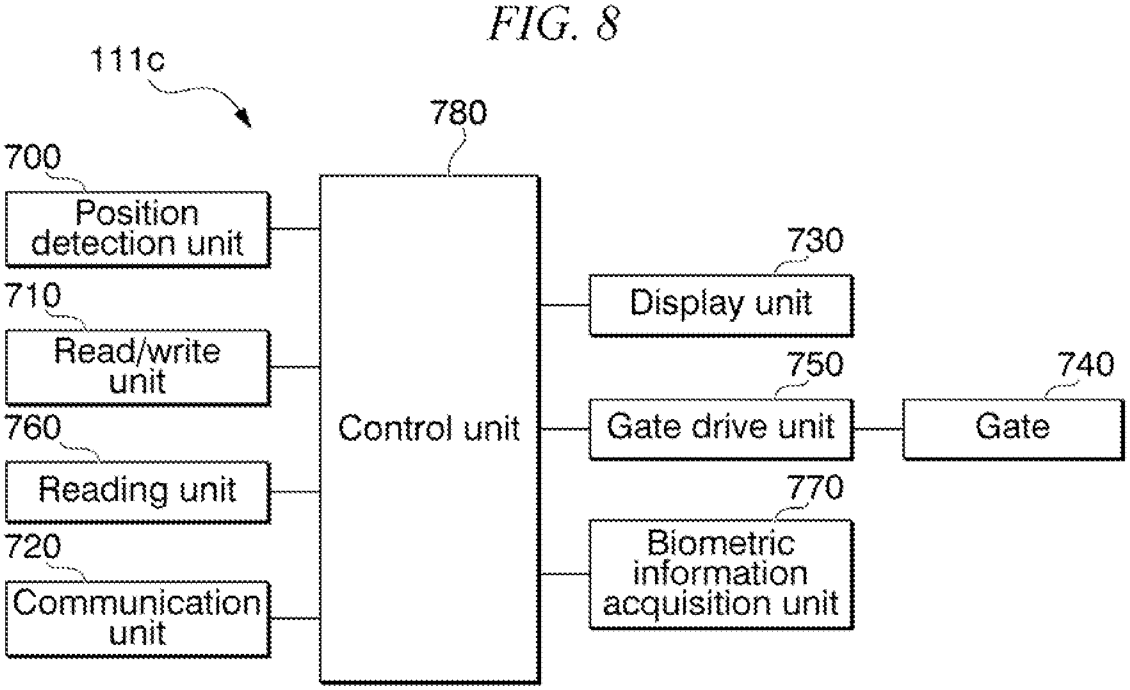
FIG. 8 is a configuration diagram of an automatic ticket examination apparatus 111*c* according to the present example embodiment.

FIG. 8 is a schematic configuration diagram of the automatic ticket examination apparatus 111c according to the present example embodiment. The automatic ticket examination apparatus 111c is provided with a position detection unit 700, a read/write unit 710, a communication unit 720, a display unit 730, a gate 740, a gate drive unit 750, a reading unit 760, a biometric information acquisition unit 770, and a control unit 780.

The position detection unit 700 detects the position of a user passing through the ticket examination passage. The position detection unit 700 outputs the detection result to the control unit 780. The position detection unit 700 may be provided with the same constitution as the position detection unit 200.

The read/write unit 710 reads the ticket information including the IC number from the IC card that is being held. The read/write unit 710 outputs the read ticket information to the control unit 780. The read/write unit 710 may be provided with the same constitution as the read/write unit 210.

The communication unit 720 transmits and receives various pieces of data to/from the station server device 113c. The communication unit 720 is a communication interface that connects the automatic ticket examination apparatus 111c to a communication network by wire or wirelessly, in order to execute data communication according to a predetermined communication protocol with an external device such as a station server device 113c via this communication network. The communication unit 720 transmits the ticket information read by the read/write unit 710 to the station server device 113c. Further, the communication unit 720 receives, for example, a determination result of passage permission/prohibition for the user from the station server device 113c.

The display unit 730 is provided in each gate body and displays a message to users passing through the ticket examination passage. The display unit 730 has the same constitution as the display unit 230.

The gate 740 has the same constitution as the gate 240.

The gate drive unit 750 opens and closes the gate 740 based on the determination result of passage permission/prohibition received from the station server device 113*c*. The gate drive unit 750 has the same constitution as the gate drive unit 250.

The reading unit 760 captures an image of the two-dimensional code displayed on a paper medium or the communication terminal 130, and acquires a digital image of the two-dimensional code. The reading unit 760 transmits the digital image to the control unit 780. The control unit 780 acquires ticket information based on the image data and executes ticket examination processing. For example, the user holds the QR code at the QR code reading unit 17 and passes through the ticket examination passage.

The biometric information acquisition unit 770 is equipped with a camera and captures an image of the user's face. This camera is installed so that the user's face can be imaged. The biometric information acquisition unit 770 converts facial feature quantities into data as biometric information from the user's facial image. The biometric information acquisition unit 770 outputs the biometric information to the control unit 780.

The control unit 780 controls the operation of each unit of the position detection unit 700, the read/write unit 710, the communication unit 720, the display unit 730, the gate 740, and the gate drive unit 750. The control unit 780 may be provided with a processor such as a CPU or MPU and a non-volatile or volatile semiconductor memory (for example, RAM, ROM, flash memory, EPROM, and EEPROM). For example, the control unit 780 may be a microcontroller such as an MCU. The control unit 780, upon acquiring the digital image captured by the reading unit 760, optically reads the two-dimensional code from the digital image. The control unit 780 acquires the ticket information recorded in the two-dimensional code that was read. Then the control unit 780 transmits the ticket information that was read to the station server device 113*c*. The control unit 780, upon acquiring the biometric information from the biometric information acquisition unit 770, transmits the biometric information to the station server device 113*c*.

The registration device 112*c* is installed near the ticket barrier of station C or the station office. The registration device 112*c* has the same constitution as the registration device 112*a*.

The station server device 113*c* performs authentication processing by any of IC card authentication, two-dimensional code authentication, and biometric authentication in the ticket examination processing of station C. The station server device 113*c* is provided with one or more physical servers (information processing devices). A plurality of physical servers can communicate with each other by being connected to each other via a communication network. The physical server may include one or more virtual servers. The virtual server may be a server on a cloud system, that is, a cloud server.

A configuration example of the station server device 113*c* of the present example embodiment will be described. The station server device 113*c* is provided with a communication unit 400*c*, a registration database 410*c*, a control unit 420*c*, and a history database 430*c*.

The communication unit 400*c* is connected to a plurality of automatic ticket examination apparatuses 111*c* installed at station C so as to be able to communicate by wire or wirelessly therewith. The communication unit 400*c* is connected to the communication network N and transmits/receives information to/from the center server 120.

The registration database 410*c* has the same constitution as the registration database 410.

The control unit 420*c* controls the operation of the station server device 113*c*. The control unit 420*c* is provided with an authentication unit 421*c*, a history data generation unit 422*c*, and a settlement unit 423*c*.

The authentication unit 421*c* has a function of IC card authentication processing. Further, the authentication unit 421*c* has a function of two-dimensional code authentication. In addition, the authentication unit 421*c* has a biometric authentication function. For example, the authentication unit 421*c* collates the biometric information from the biometric information acquisition unit 770 with the biometric information registered in the registration database 410*c*, and if the collation is successful, transmits information of passage being permitted to the automatic ticket examination apparatus 111*c*. That is, if the biometric information is registered in the registration database 410*c* from the biometric information acquisition unit 770, the authentication unit 421*c* transmits information of passage being permitted to the automatic ticket examination apparatus 111*c*. On the other hand, if the biometric information is not registered in the registration database 410*c*, the authentication unit 421*c* transmits information of passage being prohibited to the automatic ticket examination apparatus 111*c*.

When authentication of the user is successful by any of IC card authentication, two-dimensional code authentication and biometric authentication, the history data generation unit 422*c* generates history data in which the user ID, the station where the authentication was performed, the entry/exit status, and the authentication scheme that was used are associated with each other. The history data generation unit 422*c* stores the history data in the history database 430*c*.

The history data stored in the history database 430*c* is transmitted to the center server 120 by the communication unit 400*c*.

The settlement unit 423*c* handles payment settlement of the user. For example, when the user passes through the ticket examination passage from the ticket examination premises and exits, the settlement unit 423*c* may perform payment settlement for the user when the user has been authenticated by the authentication unit 421*c* as being a registrant.

The center server 120 may be a central monitoring device managed by a railway operator that operates a railway business including station A, station B, and station C. The center server 120 manages the station server devices 113*a*, 113*b*, 113*c* of all stations operated by the railway operator. The center server 120 is provided with one or more physical servers (information processing devices). A plurality of physical servers can communicate with each other by being connected to each other via a communication network. The physical server may be provided with one or more virtual servers. The virtual server may be a server on a cloud system, that is, a cloud server.

Figure 9:
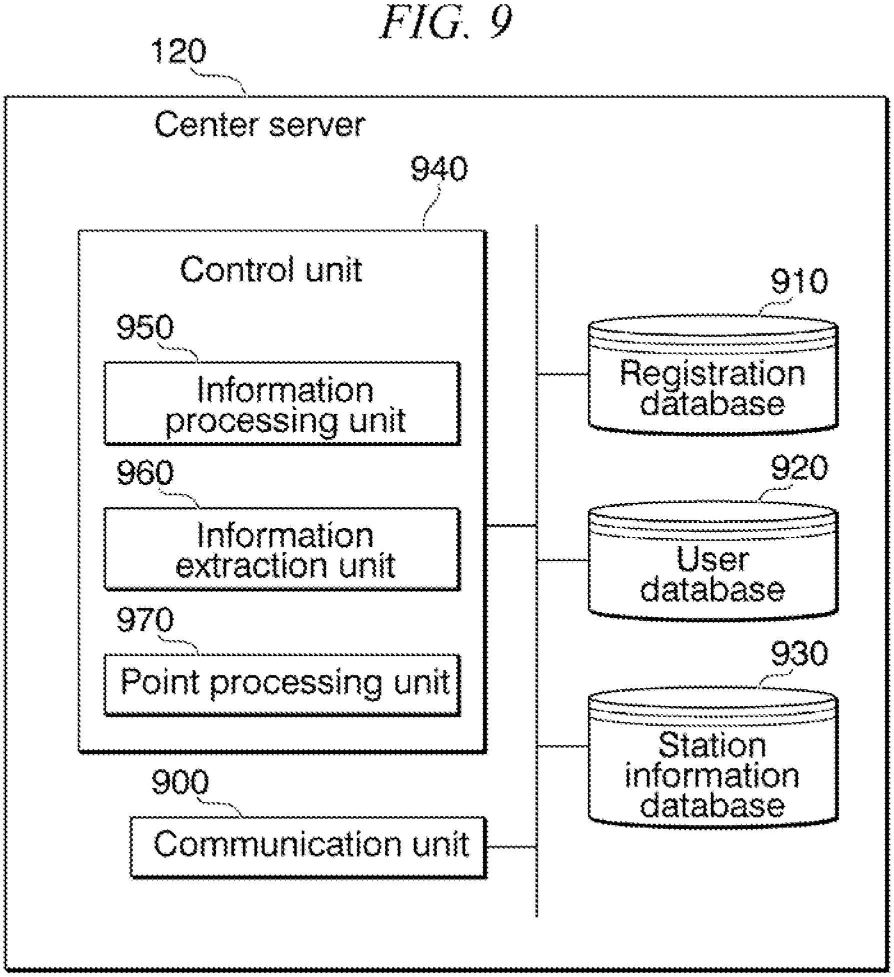
FIG. 9 is a configuration diagram of a center server 120 in the present example embodiment.

Hereinbelow, the center server 120 of this example embodiment will be described. FIG. 9 is a configuration example of the center server 120 of the present example embodiment. As shown in FIG. 9, the center server 120 is provided with a communication unit 900, a registration database 910, a user database 920, a station information database 930, and a control unit 940.

The communication unit 900 transmits/receives information to/from the station server devices 113*a*, 113*b*, 113*c* of all stations via the communication network N. Further, the communication unit 900 transmits/receives information via the communication terminal 130 and the communication network N.

Authentication data is stored in the registration database 910. For example, the registration database 910 stores authentication data sent from the station server devices 113*a*, 113*b*, 113*c*. The authentication data stored in the registration database 910 is transmitted by the control unit 940 to the station server devices 113*a*, 113*b*, 113*c* of all of the station A, station B, and station C under the control of the center server 120. As a result, the authentication data relating to all the registrants registered by the registration devices 112*a*, 112*b*, 112*c* are stored in the station server devices 113*a*, 113*b*, 113*c* of station A, station B, and station C.

The user database 920 stores the history data sent from the station server devices 113*a*, 113*b*, 113*c*. The history data stored in the user database 920 is transmitted by the control unit 940 to the station server devices 113*a*, 113*b*, 113*c* of all of the stations A, B, and C under the control of the center server 120. As a result, user history data is stored in the station server devices 113*a*, 113*b*, 113*c* of the stations A, B, and C.

Figures 10, 11:
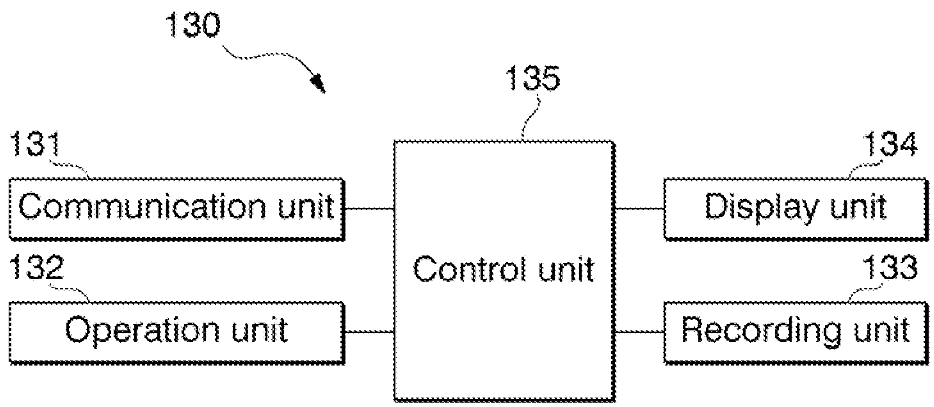
FIG. 10 is a diagram showing an example of an authentication scheme table in the present example embodiment.
FIG. 11 is a configuration diagram of a communication terminal 130 in the present example embodiment.

The station information database 930 stores information obtained by associating first information that specifies a station with second information that indicates the entrance and exit authentication scheme available in the ticket examination system 110 of the station. FIG. 10 is a diagram showing in a table format information stored in the station information database. In the station information database, an authentication scheme table is provided for each station. In the authentication scheme table, the first information for specifying a station and the second information indicating the entrance and exit authentication scheme that can be used in the ticket examination system 110 of the station are associated with each other.

The first information is information that specifies each of the station A, station B, and station C managed by the center server 120.

The second information is information on the entrance/exit authentication scheme that can be used in the ticket examination system 110 of the station. In one example of this example embodiment, the three authentication schemes of face authentication, IC card authentication, and two-dimensional code authentication can be considered as authentication schemes. At station A, only IC card authentication can be used. Therefore, the first information indicating station A is associated with the second information that IC card authentication can be used and other authentication schemes cannot be used. At station B, only IC card authentication and two-dimensional code authentication can be used. Therefore, the first information indicating station C is associated with the second information that IC card authentication and two-dimensional code authentication can be used and the other authentication scheme cannot be used. At station C, IC card authentication, two-dimensional code authentication and face authentication can be used. Therefore, the first information indicating station C is associated with the second information that IC card authentication, two-dimensional code authentication, and face authentication can be used.

The person in charge of the center server 120 may register or update the first information and the second information in the station information database 930 using a dedicated communication terminal. When the second information is stored in each of the station server devices 113*a*, 113*b*, 113*c*, the center server 120 communicates with each of the station server devices 113*a*, 113*b*, 113*c* to update the second information stored in the station information database 930 to the latest second information.

The control unit 940 controls the operation of the center server 120. The control unit 940 is provided with an information processing unit 950, an information extraction unit 960, and a point processing unit 970.

The information processing unit 950 stores authentication data in the registration database 910. The information processing unit 950 transmits the authentication data stored in the registration database 910 to the station server devices 113*a*, 113*b*, 113*c*. The information processing unit 950 stores history data in the user database 920. The information processing unit 950 transmits the history data stored in the user database 920 to the station server devices 113*a*, 113*b*, 113*c*. The information processing unit 950 may store the first information and the second information in the station information database 930 in association with each other.

The information extraction unit 960, upon receiving the first inquiry information in which is included the first information that specifies a station from the communication terminal 130, extracts the second information associated with the first information included in the first inquiry information from the station information database 930. Then, the information extraction unit 960 transmits the second information extracted from the station information database to the communication terminal 130, which is the transmission destination of the first inquiry information, via the communication network N. That is, the communication unit 900 outputs the second information extracted from the station information database by the information extraction unit 960 to the communication terminal 130.

The point processing unit 970 grants points according to the authentication scheme used by the user during entry or exit ticket examination. For example, the point processing unit 970 grants higher points when biometric authentication is used than when media authentication is used. For example, the point processing unit 970, referring to the user database, grants points to the user according to the authentication scheme used by the user in at least either of entrance and exit ticket examination. As an example, the point processing unit 970, referring to the user database, grants first points (for example, 80 pts) to a user who uses face recognition, grants second points (for example, 50 pts) to a user who uses a two-dimensional code, and third points (for example, 10 pts) to a user who uses IC card authentication in at least either of entrance and exit through the ticket examination.

Here, the points are higher in the order of third points, second points, and first points. Granting points means, for example, associating the user ID stored in the user database with the information of the points according to the authentication scheme used. The user can confirm the points associated with his/her user ID from the communication terminal 130.

The point processing unit 970 may grant points according to the combination of the authentication scheme used when the user enters ticket examination premises and the authentication scheme used when the user exits ticket examination premises. For example, the point processing unit 970 may grant the first points when the user enters and exits ticket examination by face authentication, grant the second points when the user enters and exits ticket examination by two-dimensional code authentication, and grant the third points when the user enters or exits ticket examination with IC card authentication.

The point processing unit 970 may output in advance to the communication terminal 130 information on points (point-granting information) that can be granted to the user according to the authentication scheme used at least in either the case where the user enters the ticket examination premises or the case where the user exits the ticket examination premises. For example, when the point processing unit 970 has received from the communication terminal 130 second inquiry information which is an inquiry of the points that can be granted, the point-granting information is transmitted to the communication terminal 130 which is the transmission destination of the second inquiry information via the communication network N. For example, the point-granting information is information indicating that the first points are granted to a user who uses face recognition, the second points are granted to a user who uses a two-dimensional code, and the third points are granted to a user who uses IC card authentication.

The point processing unit 970 may output to the communication terminal 130 in advance as point-granting information the information on the points granted according to a combination of the authentication scheme used when a user enters the ticket examination premises and the authentication scheme used when the user exits the ticket examination premises. For example, when the point processing unit 970 has received from the communication terminal 130 the second inquiry information which is an inquiry of the points that can be granted, the point-granting information is transmitted via the communication network N to the communication terminal 130, which is the transmission destination of the second inquiry information. The point-granting information in this case is information indicating the granting of, for example, the first points when the user enters and exits ticket examination by face authentication, the second points when the user enters and exits ticket examination by two-dimensional code authentication, and the third points when the user enters and exits ticket examination by IC card authentication.

In addition to the authentication scheme used at the entry or exit ticket examination, the point processing unit 970 may change the points granted to the user in consideration of the boarding section of the user. For example, the point processing unit 970 may grant higher points to the user as the boarding section is longer. The boarding section varies depending on the boarding station and the alighting station. That is, even if the authentication scheme used at the entry and exit ticket examination is the same, the points granted to the user are different if the boarding station or the alighting station is different. Therefore, as an example, upon receiving the second inquiry information from the communication terminal 130 of the user who has entered the ticket examination premises, the point processing unit 970 may calculate the points that can be granted to the user according to at least one of the authentication scheme used at the time of entry, the boarding station, the alighting station, and position information of the communication terminal 130. Then, the point processing unit 970 may transmit the calculated points to the communication terminal 130 as point-granting information.

For example, it is assumed that the second inquiry information includes the user ID and information of the alighting station. The point processing unit 970 extracts the information of the entrance station associated with the user ID included in the second inquiry information and the information of the authentication scheme used at that time from the user database 920. Then, the point processing unit 970 may transmit to the communication terminal 130 information of the total points obtained by summing the section points, which are the points according to the section between the entrance station and the alighting station, and the points according to the authentication scheme that can be used when exiting at the alighting station, as the point-granting information.

For example, when the only authentication scheme that can be used at the alighting station is IC card authentication, the point processing unit 970 may transmit to the communication terminal 130 the total points obtained by summing the section points and the third points as point-granting information.

For example, when the only authentication schemes that can be used at the alighting station are IC card authentication and two-dimensional code authentication, the point processing unit 970 may transmit to the communication terminal 130 two pieces of information of total points, being the total points obtained by summing the section points and the third points and the total points obtained by summing the section points and the second points, as point-granting information.

For example, when the authentication schemes that can be used at the alighting station are IC card authentication, two-dimensional code authentication, and face authentication, the point processing unit 970 may transmit to the communication terminal 130 three pieces of information of total points, being the total points obtained by summing the section points and the first points, the total points obtained by summing the section points and the second points, and the total points obtained by summing the section points and the third points, as point-granting information.

For example, it is assumed that the second inquiry information includes the user ID and the location information of the communication terminal 130. The point processing unit 970 extracts from the user database 920 the information of the entrance station associated with the user ID included in the second inquiry information and the information of the authentication scheme used at that time. Then, the point processing unit 970 sets each station from the position information over a predetermined section ahead as the alighting station. The point processing unit 970 sets each station from the position information over a predetermined section ahead as the alighting station. The point processing unit 970 may transmit to the communication terminal 130 information of the total points obtained by summing the section points and the points according to the authentication scheme that can be used when exiting the alighting station, as point-granting information found for each alighting station.

The point-granting information may include the second information.

The communication terminal 130 may be a personal computer or a mobile terminal. The communication terminal 130 is a mobile phone, a smartphone, a PDA, a tablet, a notebook computer or a laptop computer, a wearable computer, and the like. The communication terminal 130, upon receiving the second information via the communication network N, displays the second information on the display screen. The communication terminal 130, upon receiving the second information from the center server 120 via the communication network N, displays the second information on the display screen. When the communication terminal 130 receives the point-granting information from the center server 120 via the communication network N, the communication terminal 130 displays the point-granting information on the display screen.

FIG. 11 is a configuration diagram of the communication terminal 130 of the present example embodiment. As shown in FIG. 11, the communication terminal 130 is provided with a processor, a memory, and a communication interface. As an example, the communication terminal 130 is provided with a communication unit 131, an operation unit 132, a storage unit 133, a display unit 134, and a control unit 135.

The communication unit 131 sends and receives information to and from the center server 120 via the communication network N.

The operation unit 132 receives the user's operation. For example, the operation unit 132 is a user interface such as a button or a touch panel.

The storage unit 133 is composed of RAM, ROM, and the like, and stores an OS (Operating System), a control program, an installed application program, and various data.

The display unit 134 is provided with a display such as an LCD (Liquid Crystal Display) or an organic EL (Electroluminescence).

Figure 12:
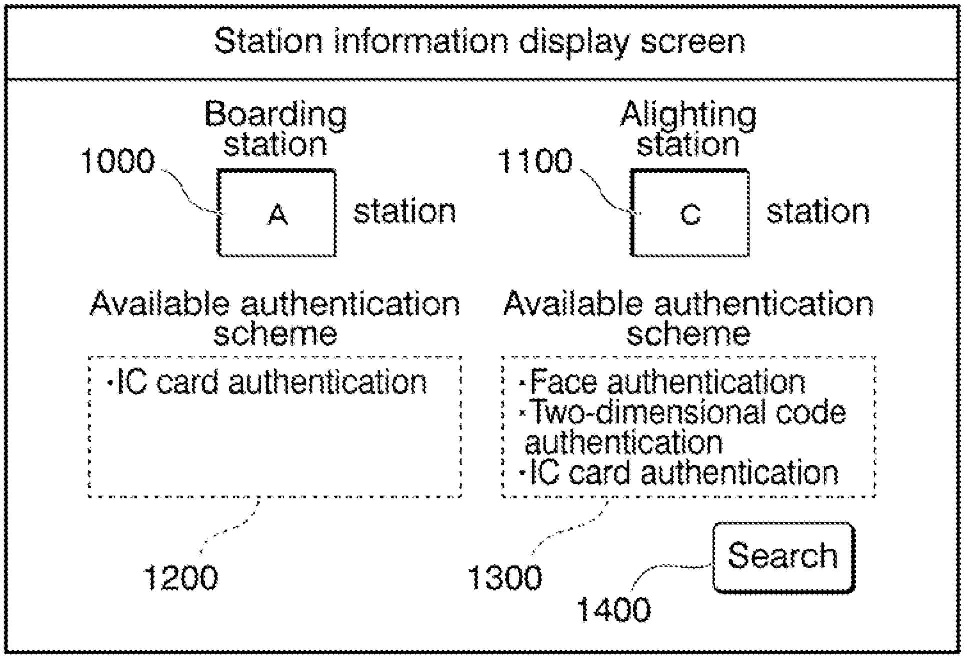
FIG. 12 is a diagram showing an example of a station information display screen in the present example embodiment.

The control unit 135 controls each functional unit of the communication terminal 130. The control unit 135 displays the second information received from the center server 120 via the communication network N on the display unit 134 by the application installed in the communication terminal 130 in advance. FIG. 12 is an example of the second information displayed on the display unit 134. The control unit 135 displays a station information display screen according to the operation received by the operation unit 132. The station information display screen has an input field 1000 for inputting a departure station and an input field 1100 for inputting an alighting station. Further, the station information display screen is provided with a display field 1200 that displays the authentication scheme that can be used at the input departure station. The station information display screen is provided with a display field 1300 that displays an authentication scheme that can be used at the input alighting station. Further, a search button 1400 is displayed on the station information display screen.

For example, the user operates the operation unit 132 to select a boarding station and an alighting station. Thereby, the boarding station is input in the input field 1000, and the alighting station is input in the input field 1100. When the search button 1400 is operated, the control unit 135 transmits to the center server 120 via the communication network N the first inquiry information including the first information indicating the station input in the input field 1000 and the first information indicating the station input in the input field 1100. In the example shown in FIG. 12, when the search button 1400 is operated, the control unit 135 transmits the first inquiry information including the first information of station A and the first information of station C to the center server 120 via the communication network N. Then, the control unit 135, upon receiving the second information of the departure station and the alighting station from the center server 120 via the communication network N, displays the second information in each of the display field 1200 and the display field 1300. In the example shown in FIG. 12, the control unit 135 displays information indicating IC card authentication in the display field 1200, and displays face recognition, two-dimensional code authentication, and IC card authentication in the display field 1300. The station information display screen of the present example embodiment is not particularly limited with respect to the display order of the authentication schemes in the display field 1200 and the display field 1300. For example, the display order of the authentication schemes displayed in the display field 1200 and the display field 1300 may be determined according to the frequency of use of each authentication scheme by the user who owns the communication terminal 130 or passengers other than the user. For example, the display order of the authentication schemes displayed in the display field 1200 and the display field 1300 may be displayed in the ascending order or descending order of frequency of use. Further, the display order of the authentication schemes displayed in the display field 1200 and the display field 1300 may be determined according to the priority order of the authentication schemes set in advance by the user.

In FIG. 12, the control unit 135 displays the authentication scheme that can be used at the station input in the input field 1000 in the display field 1200, but is not limited thereto. For example, the control unit 135 may display in the display field 1200 the authentication scheme that can be used at the station input in the input field 1000 and the authentication that can be used by user. Similarly, the control unit 135 displays the authentication scheme that can be used at the station input in the input field 1100 in the display field 1300, but is not limited thereto. For example, the control unit 135 may display in the display field 1300 the authentication scheme that can be used at the station input in the input field 1100 and the authentication scheme that can be used by the user. For example, if the user's biometric information is not registered in advance, the user cannot use face recognition. Similarly, if the user's two-dimensional code is not registered in advance, the user cannot use two-dimensional code authentication. Accordingly, even if for example the authentication schemes that can be used at station C entered in the input field 1100 are face authentication, two-dimensional code authentication, and IC card authentication, if face authentication cannot be used, the control unit 135 may display only two-dimensional code authentication and IC card authentication without displaying face recognition. Also, the control unit 135 may display in the display field 1200 the authentication scheme that can be used at the station input in the input field 1000, and display in an identifiable manner in the display field 1200 the authentication scheme that can be used by the user among the authentication schemes displayed in the display field 1200. This also applies to the display field 1300. For example, it is assumed that the authentication schemes that can be used at station C entered in the input field 1100 are face authentication, two-dimensional code authentication, and IC card authentication, while the authentication schemes that can be used by the user are only two-dimensional code authentication and IC card authentication (face authentication cannot be used). In this case, the control unit 135 may display two-dimensional code authentication and IC card authentication in the display field 1300 in a first color, and display face authentication in the display field 1300 in a second color different from the first color. Further, the control unit 135 may display in the display unit 134 a message prompting the registration of a face image (biometric information) when, for example, the user cannot use face authentication even though the boarding station or alighting station supports the face recognition method. By communicating with the center server 120, the control unit 135 may receive from the center server 120 information on the authentication schemes available to the user.

Figure 13:
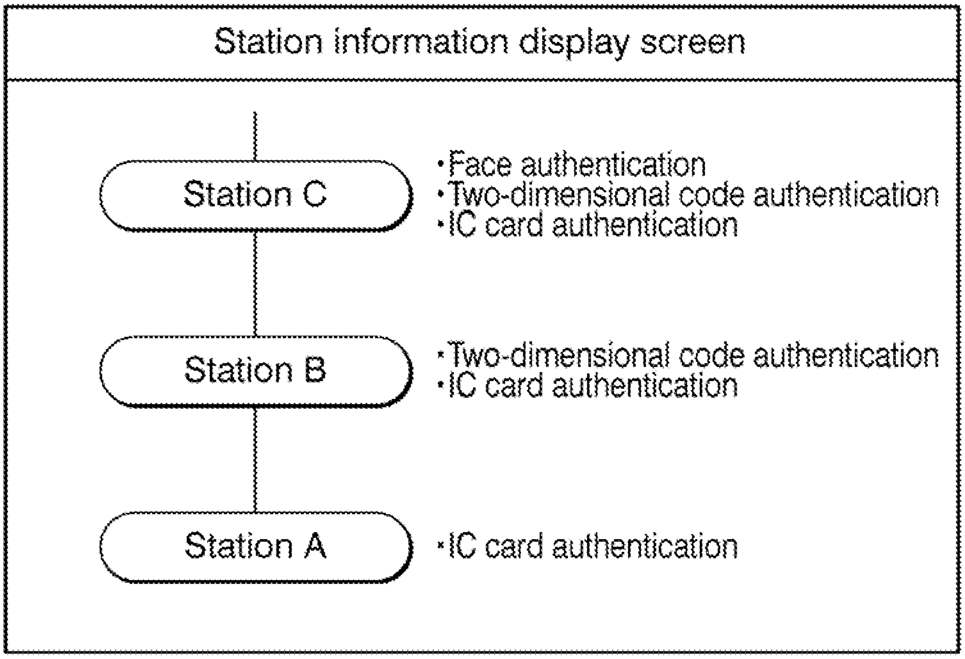
FIG. 13 is a diagram showing an example of a station information display screen in the present example embodiment.

FIG. 13 is an example of the second information displayed on the display unit 134. For example, the user operates the operation unit 132 to display a plurality of stations on the display unit 134 of the communication terminal 130. This display screen may be a route screen showing the route from the boarding station to the alighting station. As a result, the control unit 135 transmits the first inquiry information including the first information of each station from the boarding station to the alighting station to the center server 120 when displaying the route from the boarding station to the alighting station. Then, as shown in FIG. 13, the control unit 135 may display the second information received from the center server 120 via the communication network N in association with each station displayed on the route screen. When the station information display screen shown in FIG. 13 is displayed on the display unit 134, the control unit 135 may preferentially display a route including stations that support authentication schemes that can be used by the user when there are multiple route candidates between the boarding station and the alighting station.

Figure 14:
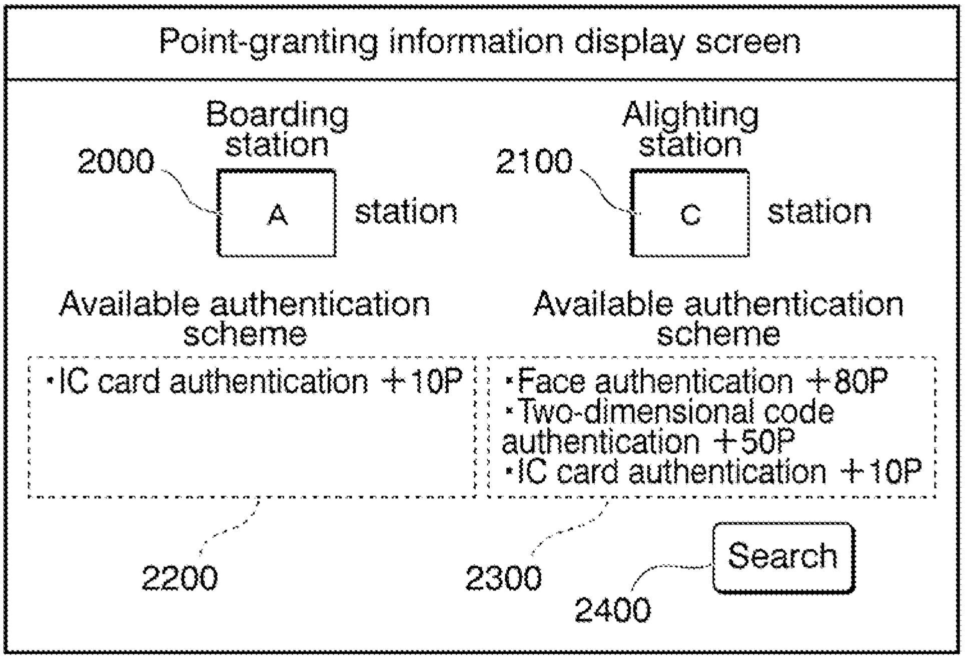
FIG. 14 is a diagram showing an example of a point-granting information display screen in the present example embodiment.

The control unit 135 displays the point-granting information received from the center server 120 via the communication network N on the display unit 134 by an application installed in the communication terminal 130 in advance. FIG. 14 is an example of point-granting information displayed on the display unit 134. The control unit 135 displays a point-granting information display screen according to the operation received by the operation unit 132. The point-granting information display screen has an input field 2000 for inputting a departure station and an input field 2100 for inputting an alighting station. Further, the point-granting information display screen is provided with a display field 2200 for displaying an authentication scheme that can be used at the input departure station and points granted when the authentication scheme is used. The station information display screen is provided with a display field 2300 for displaying an authentication scheme that can be used at the input alighting station and points granted when the authentication scheme is used. Further, a search button 2400 is displayed on the point-granting information display screen.

For example, the user operates the operation unit 132 to select a boarding station and an alighting station. Thereby, the boarding station is input in the input field 2000, and the alighting station is input in the input field 2100. When the search button 2400 is operated, the control unit 135 transmits the second inquiry information including the first information indicating the station input in the input field 2000 and the first information indicating the station input in the input field 2100 to the center server 120 via the communication network N. In the example shown in FIG. 14, when the search button 2400 is operated, the control unit 135 transmits the second inquiry information including the first information of station A and the first information of station C to the center server 120 via the communication network N. The control unit 135 receives the second information and the point-granting information from the center server 120 at each of the boarding station and the alighting station. In the example shown in FIG. 14, the control unit 135 displays in the display field 2200 information indicating IC card authentication and information of first points. Also, the control unit 135 displays in the display field 1300 information of face authentication and third points, information of two-dimensional code authentication and second points, and information of IC card authentication and first points.

The point-granting information display screen is not particularly limited in the display order of the authentication schemes in the display field 2200 and the display field 2300, as in the station information display screen. For example, the display order of the authentication schemes displayed in the display field 2200 and the display field 2300 may be determined according to the frequency of use of each authentication scheme by the user who owns the communication terminal 130 or passengers other than the user. For example, the display order of the authentication schemes displayed in the display field 2200 and the display field 2300 may be displayed in the ascending order or descending order of the frequency of use. Also, the display order of the authentication schemes displayed in the display field 2200 and the display field 2300 may be determined according to the priority order of the authentication schemes set in advance by the user. Further, the display order of the authentication schemes displayed in the display field 2200 and the display field 2300 may be the ascending order or descending order of the points granted. Also, the display order of the authentication schemes displayed in the display field 2200 and the display field 2300 may be the ascending order or descending order of the points that have been granted to the user (possessed points). The control unit 135 may receive information on the points possessed by the user from the center server 120 by communicating with the center server 120.

Figure 15:
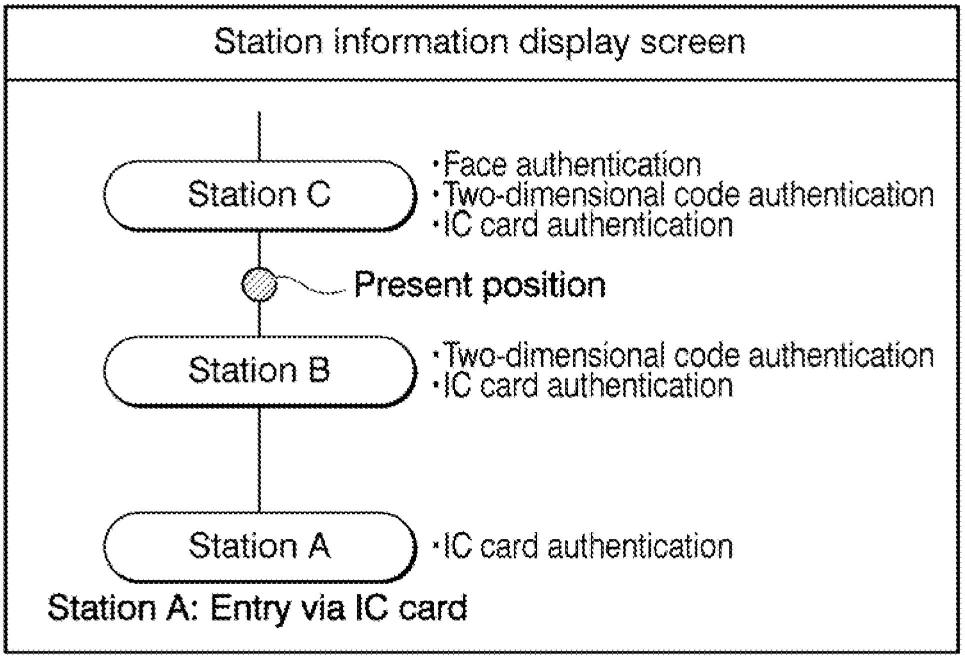
FIG. 15 is a diagram showing an example of a point-granting information display screen in the present example embodiment.

FIG. 15 is an example of point-granting information displayed on the display unit 134. For example, the user operates the operation unit 132 to display a plurality of stations on the display unit 134 of the communication terminal 130. This display screen may be a route screen showing the route from the boarding station to the alighting station. In displaying the route from the boarding station to the alighting station, the control unit 135 transmits first inquiry information including the first information of each station from the boarding station to the alighting station to the center server 120. Also, the control unit 135 transmits second inquiry information including the first information of each station from the boarding station to the alighting station to the center server 120. The first inquiry information and the second inquiry information may be one inquiry information. Then, as shown in FIG. 15, the control unit 135 may display the second information and the point-granting information received from the center server 120 via the communication network N in association with each station displayed on the route screen. When the point-granting information shown in FIG. 15 is displayed on the display unit 134, the control unit 135 may preferentially display a route including stations that support authentication schemes that can be used by the user when there are multiple route candidates between the boarding station and the alighting station. When the point-granting information shown in FIG. 15 is displayed on the display unit 134, the control unit 135 may preferentially display routes with higher points to be granted when there are multiple route candidates between the boarding station and the alighting station.

Figure 16:
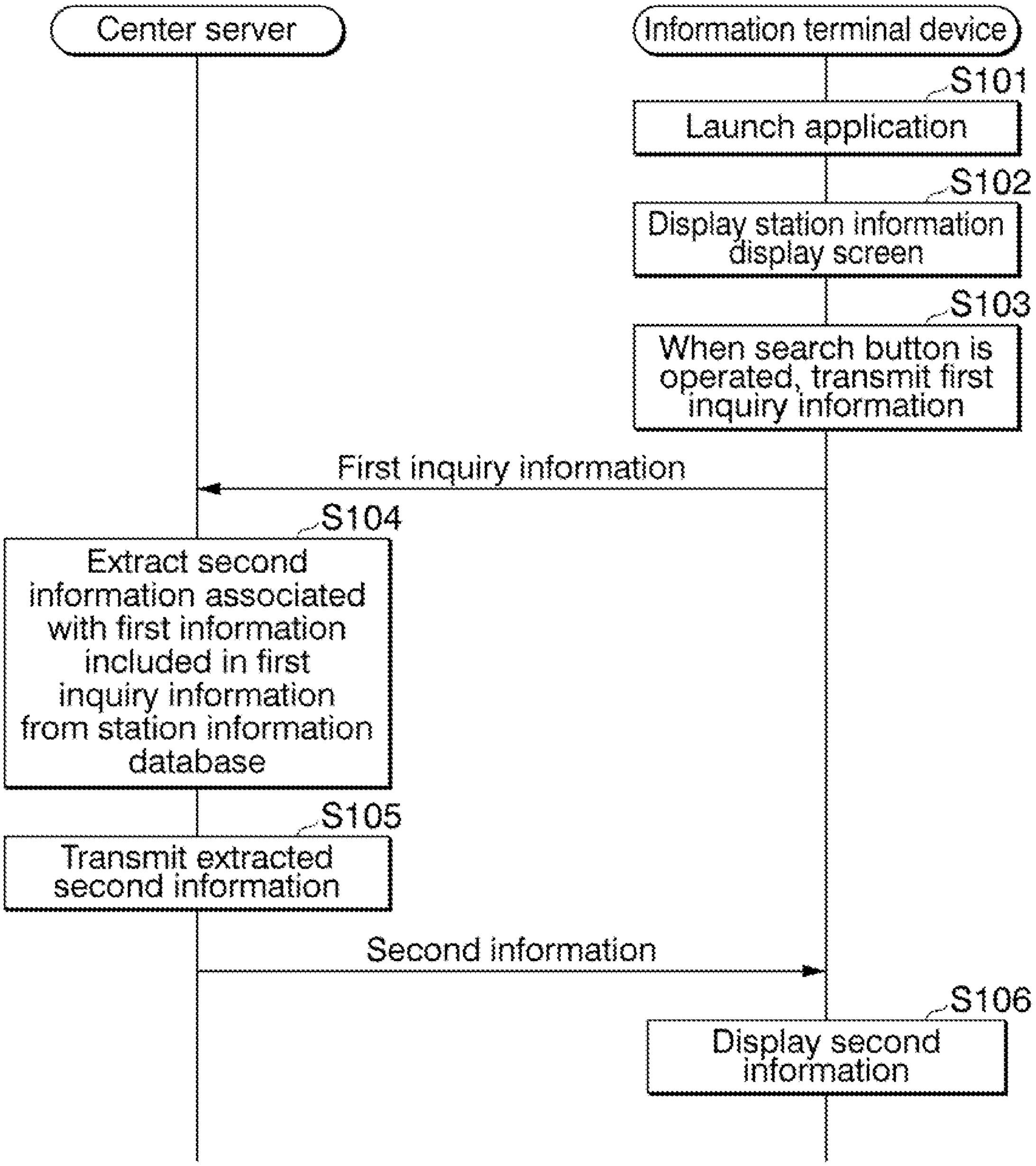
FIG. 16 is a sequence diagram for displaying the second information in the present example embodiment.

Next, the flow of displaying the second information according to the present example embodiment on the communication terminal 130 will be described with reference to FIG. 16. FIG. 16 is a diagram illustrating a flow of displaying the second information according to the present example embodiment.

The communication terminal 130 launches the application installed in the storage unit 133 by operating the operation unit 132 (Step S101). Then, the communication terminal 130 displays the station information display screen on the display unit 134 (Step S102). When the search button displayed on the station information display screen is operated, the communication terminal 130 transmits to the center server 120 the first inquiry information including each first information of the boarding station and the alighting station input to the station information display screen (Step S103).

The center server 120, upon receiving the first inquiry information from the communication terminal 130, extracts the second information associated with the first information included in the first inquiry information from the station information database 930 (Step S104). Then, the center server 120 transmits each second information extracted from the station database to the communication terminal 130 via the communication network N (Step S105). The communication terminal 130, upon receiving the second information of the boarding station and the alighting station from the center server 120, displays the second information on the station information display screen (Step S106). This allows the user to confirm what kind of authentication scheme can be used at which station.

Figure 17:
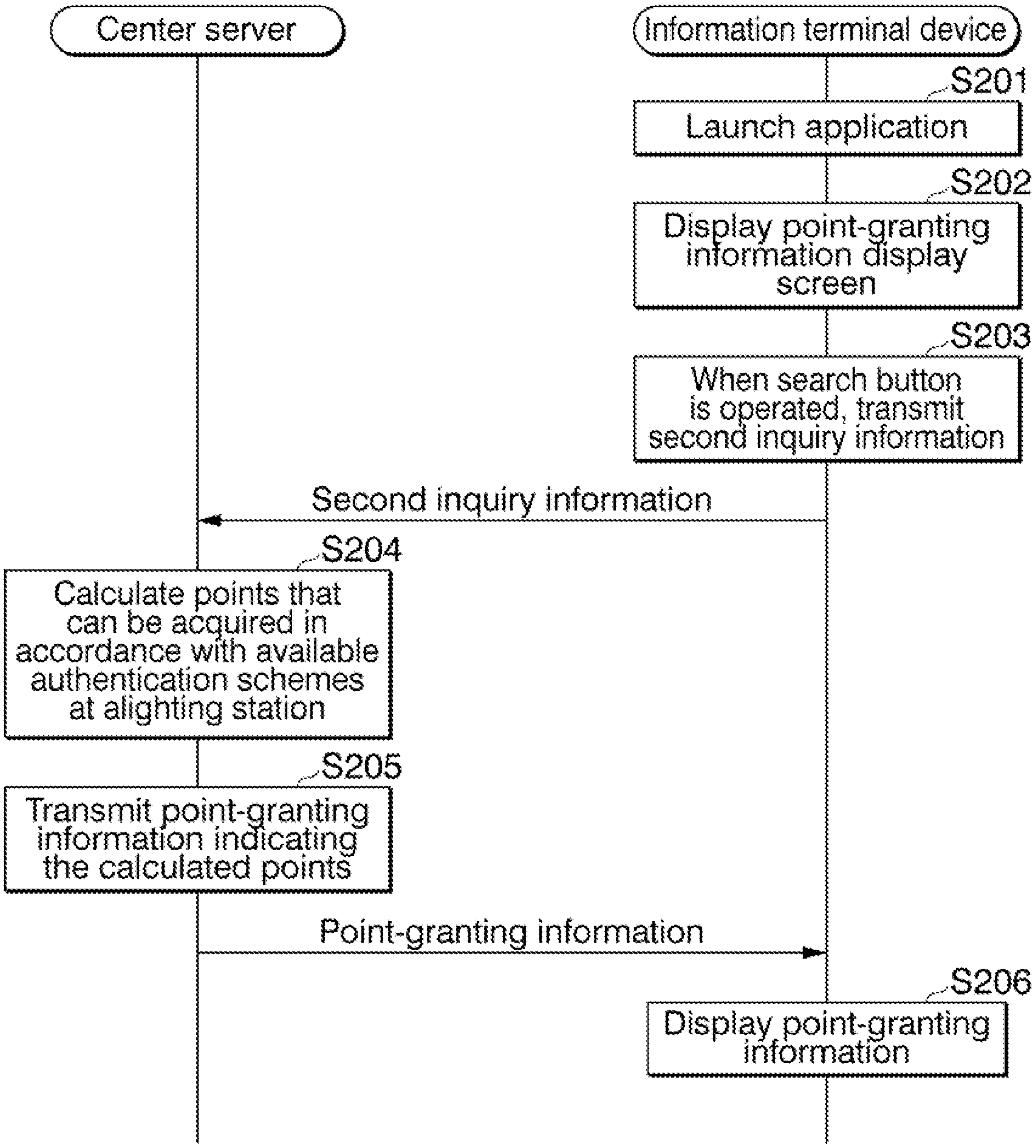
FIG. 17 is a sequence diagram for displaying point-granting information in the present example embodiment.
Figure 18:
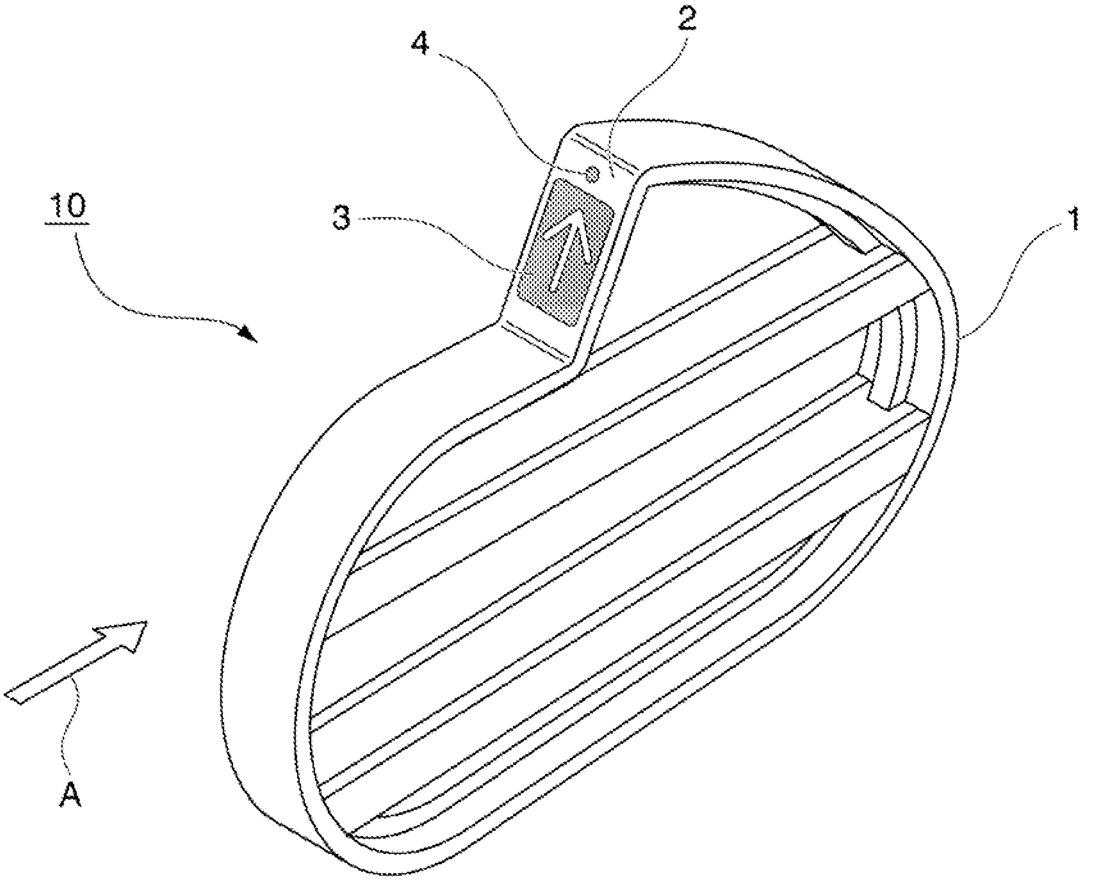
FIG. 18 is a diagram showing a configuration example of an automatic ticket examination apparatus in the present example embodiment.

Next, the flow of displaying the point-granting information according to the present example embodiment on the communication terminal 130 will be described with reference to FIG. 17. FIG. 17 is a diagram illustrating a flow of displaying point-granting information according to the present example embodiment.

The communication terminal 130 launches the application installed in the storage unit 133 by the operation of the operation unit 132 (Step S201). Then, the communication terminal 130 displays the point-granting information display screen on the display unit 134 (Step S202). When the search button displayed on the point-granting information display screen is operated, the communication terminal 130 transmits to the center server 120 second inquiry information including the boarding station and alighting station input on the point-granting information display screen and the user ID (Step S203). The center server 120 confirms the history data associated with the user ID, and if the user with the user ID has already entered the station premises, finds the points corresponding to the authentication scheme used when the user entered the ticket examination premises and the authentication schemes available when exiting at the alighting station (Step S204). Then, the center server 120 transmits the point-granting information indicating the calculated points to the communication terminal 130 of the user (Step S205). The communication terminal 130, upon receiving the point-granting information from the center server 120, displays the point-granting information on the point-granting information display screen (Step S206).

Here, the automatic ticket examination apparatus of the present example embodiment may be the gate device 10 shown in FIGS. 18 to 22. The gate device 10 has a gate body 1 provided along a second plane (for example, the vertical plane in FIG. 1) that intersects a first plane (for example, the horizontal plane in FIG. 1) in which the authentication target moves in one direction (indicated by the arrow A in FIG. 1), and that partitions the moving space of the authentication target (for example, the space in the passageway at the ticket barrier) from other spaces (spaces other than the passage), an inclined surface 2 provided on the gate body 1 so as to intersect the first plane and the second plane and to be inclined upward with respect to the first plane, a display unit 3 that displays an image on the inclined surface 2, and an image acquisition unit 4 that captures an image in the vicinity of the display unit 3.

In the gate device 10 having the above configuration, it is possible to guide an authentication target (for example, a railway passenger) moving on the floor surface as the first plane in the direction of arrow A in a passage partitioned by the gate body 1. The line of sight of the authentication target moving along the gate body 1 can be guided to the display unit 3 on the upward inclined surface 2. Further, the image acquisition unit 4 can capture an image of a passenger or the like with his/her face turned in a predetermined range by moving his/her line of sight to the display unit 3.

That is, since the face image captured by the image acquisition unit 4 is likely to be limited to the face image of the user who has turned his/her face to the display unit 3 by drawing attention to the display unit 3, the amount of image data to be processed in order to extract the feature quantity is reduced, whereby the feature quantity can be easily recognized, and the time required for authentication can be shortened.

Figure 19:
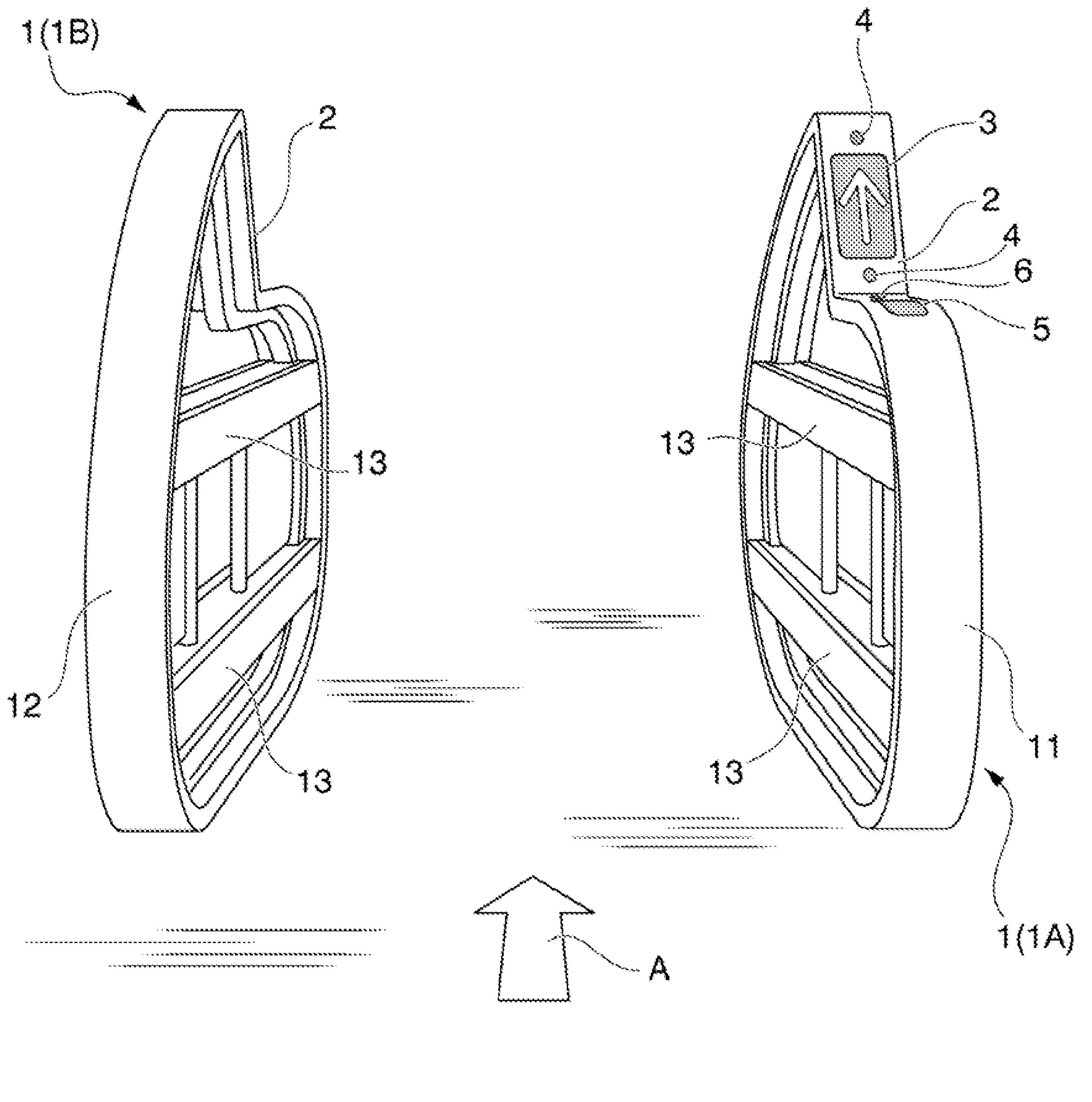
FIG. 19 is a perspective view of a gate system equipped with an automatic ticket examination apparatus according to the present example embodiment when viewed diagonally upward.
Figure 20:
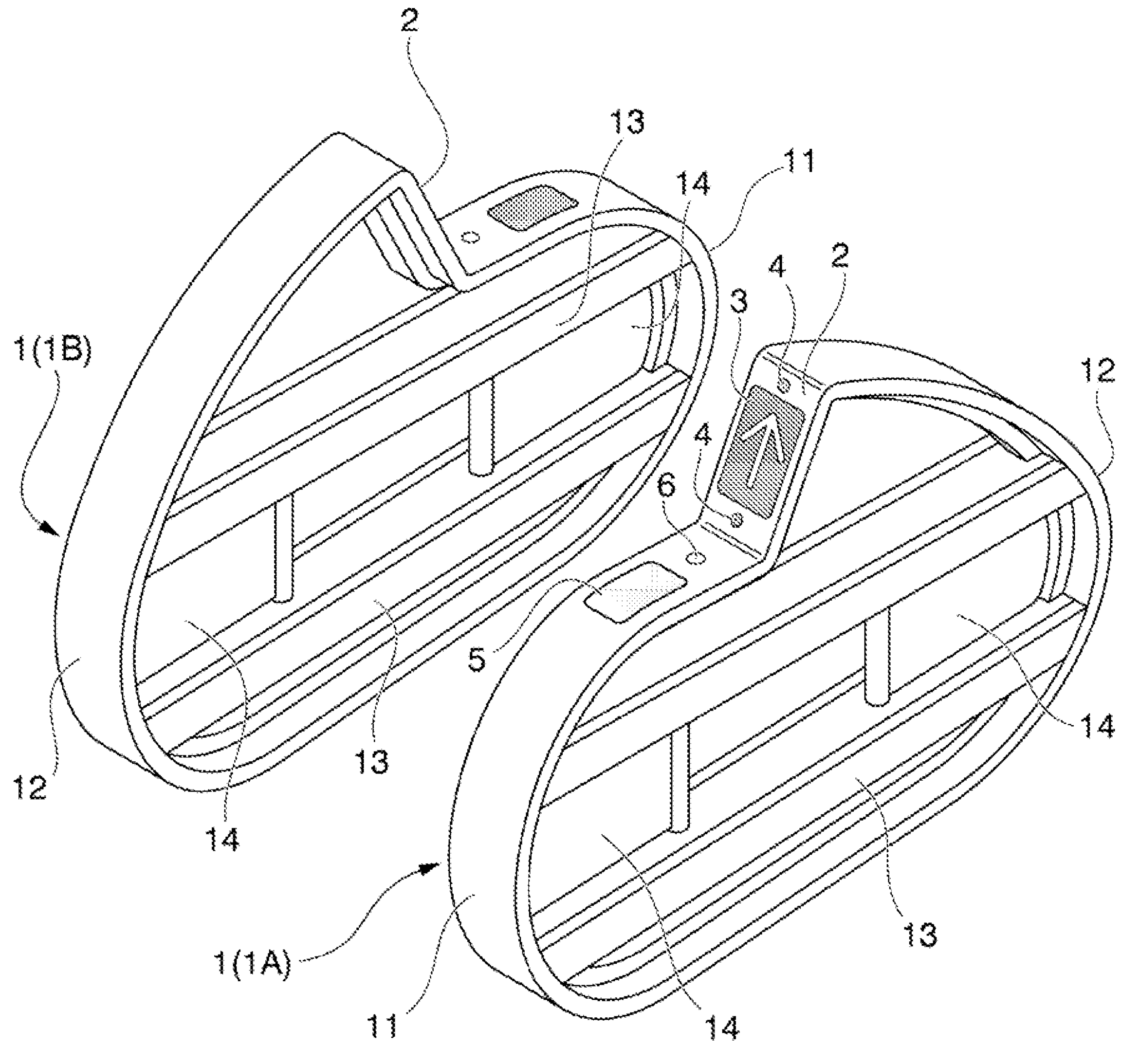
FIG. 20 is a perspective view of the device of FIG. 19 viewed from the upper front.

The gate device 10 employs a configuration in which two gate bodies 1 (1A, 1B) are arranged horizontally at intervals from each other. In FIGS. 19 and 20, the inclined surface 2 of the gate body 1A on the right side faces the front side of FIGS. 19 and 20, while the inclined surface 2 of the gate body 1B on the left side faces the back side of FIGS. 19 and 20, thus the gate bodies 1A and 1B are arranged so as to face in mutually opposite directions, and the space of the ticket barrier passage inside these gate bodies 1A and 1B is partitioned by these gate bodies 1A and 1B from the space outside the ticket barrier passage outside the gate bodies 1A and 1B. That is, the gate body 1 is arranged along a second plane (the vertical plane in the illustrated example) intersecting the first plane (the horizontal plane in the illustrated example) as the floor surface of the ticket barrier passage, whereby the space around the ticket barrier is divided into the passage and other areas.

Each of the gate bodies 1A and 1B has, for example, a structure formed by bending a reinforced plastic plate into a frame shape, having as a whole a small diameter curved portion 11, a large diameter curved portion 12, and an inclined portion having a an inclined surface 2 arranged at the ends thereof. Further, connecting members 13 and 13 are provided between the small diameter curved portion 11 and the large diameter curved portion 12, so as to increase the strength of the frame-shaped structure. Further, between the connecting members 13 and 13, a plate-shaped flapper gate 14 is provided so as to be able to rotate around a vertical axis. In the case of the illustrated example, the flapper gate 14 is provided at two positions, a position closer to the small diameter curved portion 11 and a position closer to the large diameter curved portion 12 of the gate body 1A. The flapper gate 14 is a plate-shaped or frame-shaped member that performs a well-known opening/closing operation at an automatic ticket barrier of a railway, being constituted so as to protrude as needed from the gate body 1 into the passage to close the passage between the gate bodies 1A, 1B and block the passage of passengers and the like trying to pass through this passage.

The display unit 3 is provided on the inclined surface 2 to optically display predetermined information. A display means such as a liquid crystal display, a light emitting display that selectively emits light from a large number of LEDs, and a simple reflecting surface that reflects an image projected from a projector or the like provided on a ceiling or the like is applied to the display unit 3.

Image acquisition units 4 for capturing images are provided above and below the display unit 3 of the inclined surface 2, respectively, and are configured to capture an image diagonally above the inclined surface 2.

Figure 21:
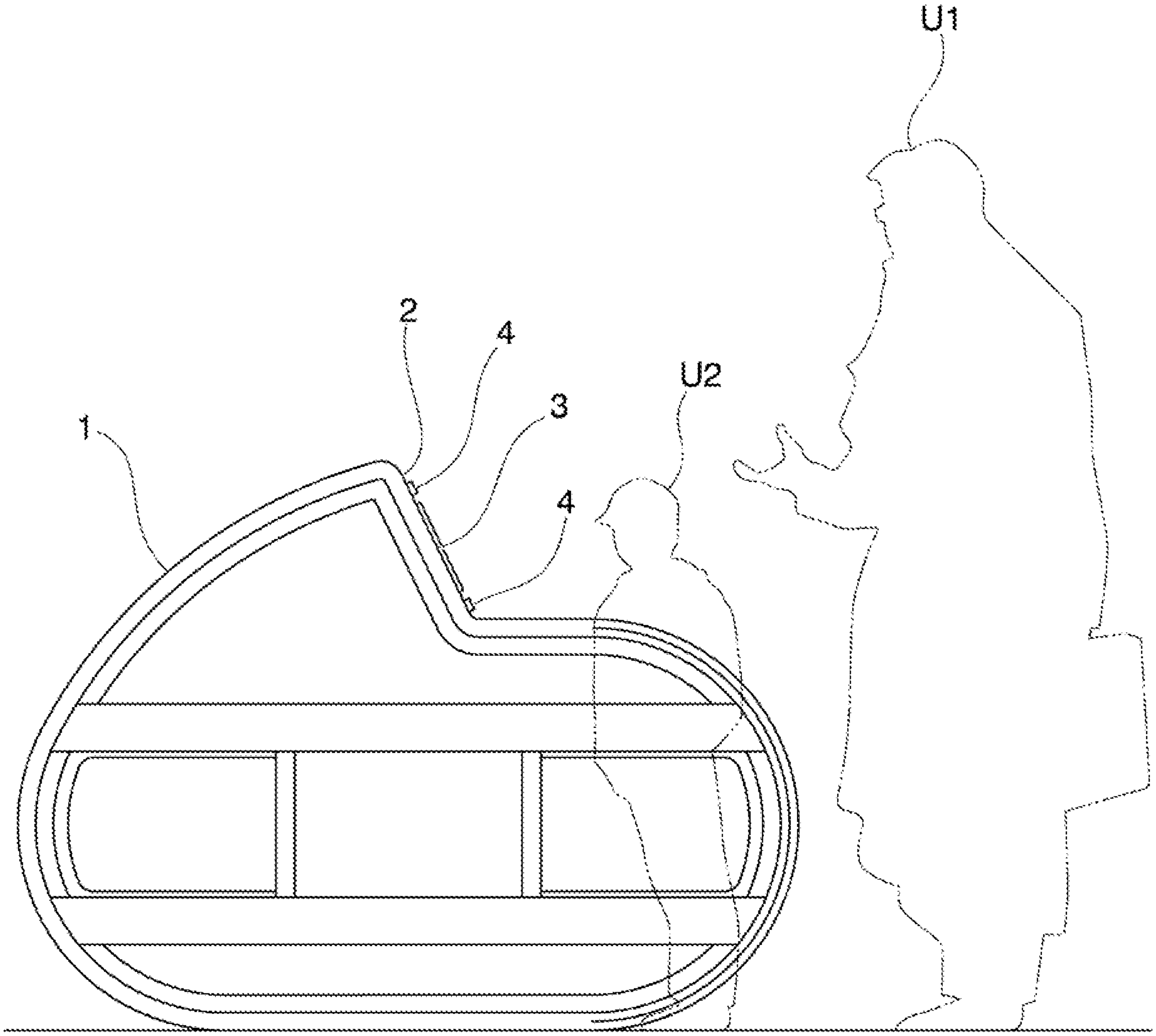
FIG. 21 is a side view of one usage mode of the automatic ticket examination apparatus in the present example embodiment.
Figure 22:
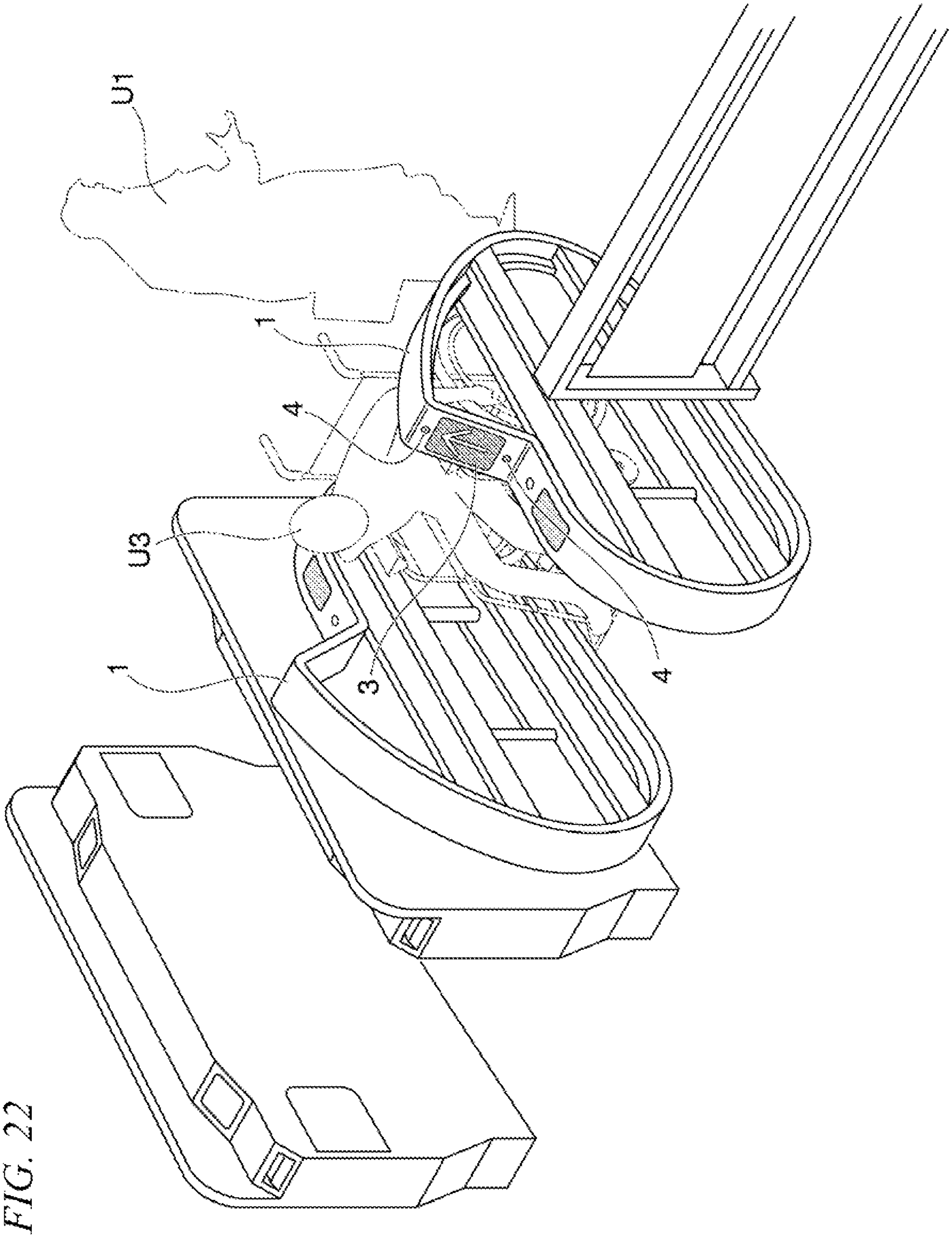
FIG. 22 is a front view of another usage mode of the automatic ticket examination apparatus in the present example embodiment.

That is, the dimensions of the gate bodies 1A and 1B are such that the image acquisition units 4 provided above and below the display unit 3 of the inclined surface 2 are arranged at a height and orientation so as to be able to capture from the front a face image of an adult user U1 with a height of 170 cm and a child U2 with a height of 110 cm as shown in FIG. 21, and moreover a wheelchair user U3 whose face is located at almost the same height as a child, as shown in FIG. 22.

Further, a data read/write unit 5 for reading or writing optical data such as a barcode, magnetic data such as a magnetic stripe, data transmitted by RF (radio frequency)

from an IC chip, and the like, and an audio input/output unit 6 composed of a microphone, a speaker or an interface device having both of these functions for sending and receiving audio signals to/from the user are provided on the upper surface of the gate body 1.

Further, a fan may be provided at the upper surface of the gate body 1, and a gate device 10 may be controlled to drive the fan for the purpose of diffusing air when the user passes or sending air to the user.

Figure 23:
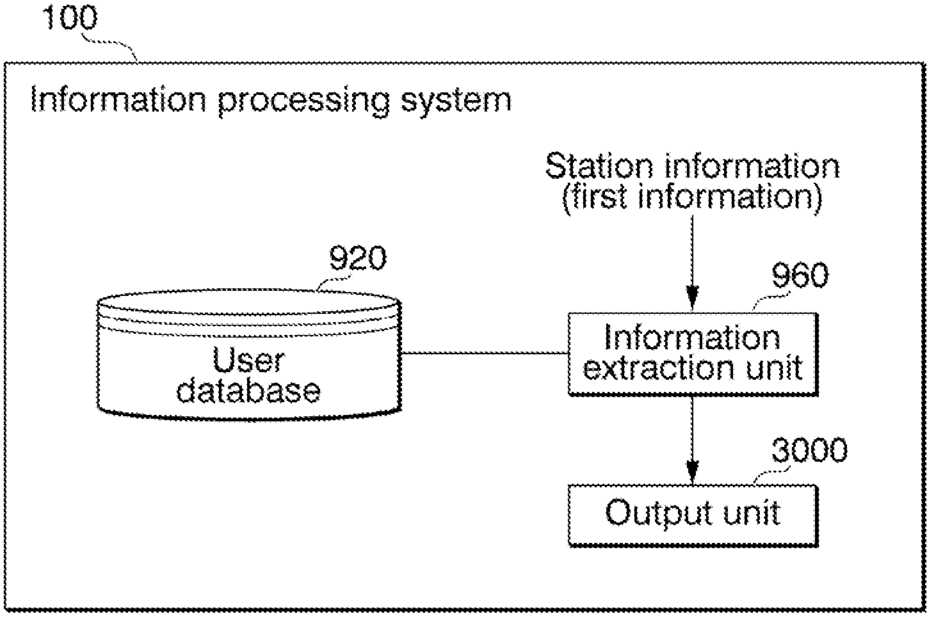
FIG. 23 is a diagram showing the minimum configuration of the information processing system 100 in the present example embodiment.

An example embodiment of the minimum configuration of the information processing system 100 of the present example embodiment will be described with reference to FIG. 23. The information processing system 100 according to the present example embodiment is provided with a station information database 930, an information extraction unit 960, and an output unit 3000. The station information database 930 stores information obtained by associating first information that specifies a station and second information that indicates the entrance and exit authentication scheme available in the ticket examination system of the station. The information extraction unit 960 extracts, from the station information database 930, the second information associated with the input first information. The output unit 3000 outputs the second information extracted by the information extraction unit 960. The output unit 3000 may be the communication terminal 130 or the communication unit 900.

This allows the user to confirm what kind of authentication scheme can be used at which station.

Further, the information processing system 100 may transmit to the communication terminal 130 in advance the points that can be earned according to the authentication scheme used at the entry or exit ticket examination. Then, the information processing system 100 grants more points by using face authentication than by media authentication. Thereby, the information processing system 100 can promote the use of face recognition.

It should be noted that all or a part of the center server 120 described above may be realized by a computer. In such a case, the computer may be provided with a processor such as a CPU and GPU and a computer-readable recording medium. Then, all or some functions of the center server 120 may be realized by recording a program for realizing these functions on a computer in a computer-readable recording medium, causing the processor to read the program recorded on the recording medium, and executing the program. Here, the "computer-readable recording medium" refers to a portable medium such as a flexible disk, a magneto-optical disk, a ROM, or a CD-ROM, or a storage device such as a hard disk built in a computer system. Further, the "computer-readable recording medium" may dynamically hold a program for a short period of time like a communication line or the like when transmitting a program via a network such as the Internet or a communication line such as a phone line, or may hold the program for a certain period of time like a volatile memory inside a computer system that is a server or a client in that case. Further, the above program may be one for realizing some of the above-mentioned functions, may be one for realizing the aforementioned functions in combination with a program already recorded in the computer system, or may be a program realized using a programmable logic device such as an FPGA (Field Programmable Gate Array).

INDUSTRIAL APPLICABILITY

In the present invention, the user can confirm what kind of authentication scheme can be used at which station.

DESCRIPTION OF THE REFERENCE SYMBOLS

100: Information processing system
110: Ticket examination system
120: Center server
130: Communication terminal
930: Station information database
960: Information extraction unit
970: Point processing unit

What is claimed is:

1. An information processing system comprising:
a user database that stores information obtained by associating first information that specifies a station with second information that indicates an entrance and exit authentication scheme available in a ticket examination system of the station;
a memory configured to store instructions; and
a processor configured to execute the instructions to:
extract, from the user database, the second information associated with input first information;
output the extracted second information;
control a gate of the station according to a result that is based on the authentication scheme; and
grant points in accordance with the authentication scheme used by a user at an entry or exit ticket examination.

2. The information processing system according to claim 1, wherein the authentication scheme comprises biometric authentication in which the ticket examination system reads biometric information from a user and collates the read biometric information with biometric information registered in a registration database to perform authentication processing, and medium authentication in which the ticket examination system reads ticket information recorded on a recording medium and collates the read ticket information with ticket information registered in the registration database.

3. The information processing system according to claim 2, wherein the processor is configured to execute the instructions to register identification information of the user, biometric information of the user, and the ticket information used for the medium authentication in the registration database in association with each other.

4. The information processing system according to claim 1, wherein the processor is configured to execute the instructions to grant higher points when biometric authentication is used than when media authentication is used.

5. The information processing system according to claim 4, wherein the processor is configured to execute the instructions to grant points according to a combination of the authentication scheme used when the user entered ticket examination premises and the authentication scheme used when the user exited from ticket examination premises.

6. The information processing system according to claim 1, the processor is configured to execute the instructions to output to a communication terminal the points that can be granted to the user according to the authentication scheme used at least in either a case where the user enters ticket examination premises or a case where the user exits from ticket examination premises.

7. The information processing system according to claim 6, wherein the processor is configured to execute the instructions to output to the communication terminal the points granted according to a combination of the authentication scheme used by the user when entering the ticket examination premises and the authentication scheme used by the user when exiting from the ticket examination premises.

8. A non-transitory computer-readable recording medium storing thereon a program for, upon execution by a computer, making the computer function as the information processing system according to claim 1.

9. The information processing system according to claim 1, wherein the authentication scheme comprises extracting biometric information from a user using a fingerprint scanner included in the ticket examination system.

10. The information processing system according to claim 1, wherein the authentication scheme comprises extracting biometric information from a user using a palm print scanner included in the ticket examination system.

11. The information processing system according to claim 1, wherein the authentication scheme comprises extracting biometric information from a user using a vein pattern scanner included in the ticket examination system.

12. The information processing system according to claim 1 further comprising the gate of the station.

13. The information processing system according to claim 1, wherein:

the station has multiple available authentication schemes; and the processor is further configured to execute the instructions to:

select the authentication scheme from the multiple available authentication schemes based on a registration status of the user.

14. An information processing method, the method comprising:

for a computer comprising a processor and a database that stores information obtained by associating first information that specifies a station with second information that indicates an entrance and exit authentication scheme available in a ticket examination system of the station:

by the computer, in response to receiving the first information from a communication terminal of a user, extracting, from the database, the second information associated with the first information;

by the computer, outputting the extracted second information to the communication terminal;

by the computer, controlling a gate of the station according to a result that is based on the authentication scheme; and by the computer, granting points in accordance with the authentication scheme used by the user at an entry or exit ticket examination.

* * * * *